United States Patent
Carl et al.

(10) Patent No.: US 12,412,143 B2
(45) Date of Patent: Sep. 9, 2025

(54) SYSTEMS AND METHODS FOR CREATING, TRAINING, AND EVALUATING MODELS, SCENARIOS, LEXICONS, AND POLICIES

(71) Applicant: Digital Reasoning Systems, Inc., Franklin, TN (US)

(72) Inventors: Brandon Carl, Franklin, TN (US); Cory Hughes, Franklin, TN (US)

(73) Assignee: Digital Reasoning Systems, Inc., Franklin, TN (US)

( * ) Notice: Subject to any disclaimer, the term of this patent is extended or adjusted under 35 U.S.C. 154(b) by 675 days.

(21) Appl. No.: 17/694,283

(22) Filed: Mar. 14, 2022

(65) Prior Publication Data
US 2022/0292426 A1     Sep. 15, 2022

Related U.S. Application Data

(60) Provisional application No. 63/162,829, filed on Mar. 18, 2021, provisional application No. 63/160,780, filed on Mar. 13, 2021.

(51) Int. Cl.
| | |
|---|---|
| *G06Q 10/0639* | (2023.01) |
| *G06F 18/21* | (2023.01) |
| *G06F 40/284* | (2020.01) |
| *G06F 40/40* | (2020.01) |
| *G06Q 10/0637* | (2023.01) |
| *H04L 51/046* | (2022.01) |
| *H04L 51/212* | (2022.01) |

(52) U.S. Cl.
CPC ... *G06Q 10/06375* (2013.01); *G06F 18/2178* (2023.01); *G06F 40/284* (2020.01); *G06F 40/40* (2020.01); *H04L 51/046* (2013.01); *G06Q 10/06395* (2013.01); *H04L 51/212* (2022.05)

(58) Field of Classification Search
CPC .................................................... H04L 51/212
See application file for complete search history.

(56) References Cited

U.S. PATENT DOCUMENTS

| | | | |
|---|---|---|---|
| 2004/0215977 A1* | 10/2004 | Goodman | H04L 51/212 726/22 |
| 2018/0041532 A1 | 2/2018 | Johnson | |
| 2020/0067861 A1* | 2/2020 | Leddy | G06F 21/6245 |

OTHER PUBLICATIONS

International Search Report and Written Opinion for International Application No. PCT/US2022/020204 dated Jul. 20, 2022.

* cited by examiner

*Primary Examiner* — Feng-Tzer Tzeng
(74) *Attorney, Agent, or Firm* — Bradley Arant Boult Cummings LLP; Adam J. Thompson, Esq.

(57) ABSTRACT

Some aspects of the present disclosure relate to systems, methods, and computer-readable media for configuring a computer system to detect violation conditions in a target dataset. In one example implementation, a computer implemented method includes: receiving data associated with an electronic communication; labelling the received data; creating a machine learning model based on the received data; creating a lexicon, where the lexicon represents one or more terms or regular expressions; creating a scenario using the machine learning models and the lexicon, where the scenario represents a violation condition; and configuring a computer system to detect violation conditions in a target dataset using the scenario, where the target dataset represents electronic communications.

17 Claims, 34 Drawing Sheets

Assignments
Assigned to you.
Assigned to you only.

Total Remaining
6

SYSTEMS AND METHODS FOR CREATING, TRAINING, AND EVALUATING MODELS, SCENARIOS, LEXICONS, AND POLICIES

CROSS-REFERENCE TO RELATED APPLICATION

This application claims priority to and benefit of U.S. provisional patent application Ser. No. 63/160,780 filed Mar. 13, 2021 and U.S. provisional patent application Ser. No. 63/162,829 filed Mar. 18, 2021, which are fully incorporated by reference and made a part hereof.

BACKGROUND

The present disclosure generally relates to monitoring communications for activity that violates ethical, legal, or other standards of behavior and poses risk or harm to institutions or individuals. The need for detecting violations in the behavior of representatives of an institution has become increasingly important in the context of proactive compliance, for instance. In the modern world of financial services, there are many dangers to large institutions from a compliance perspective, and the penalties for non-compliance can be substantial, both from a monetary standpoint and in terms of reputation. Financial institutions are coming under increasing pressure to quickly identify unauthorized trading, market manipulation and unethical conduct within their organization, for example, but often lack the tools to do so effectively.

Moreover, systems and methods for monitoring communications can be tuned or adapted to detect types of violations of behavior, or to increase the accuracy of those systems and methods. Advanced systems and methods for monitoring communication can be based on complicated models, including machine learning models and other techniques. Therefore it can be difficult for a user of a system or method to tune or adapt that system or method.

Thus, among other needs, there exists a need for effective identification of violation conditions from electronic communications. Furthermore, there exists a need for effective ways to improve the identification of violation conditions and effective ways to configure systems to identify violation conditions. It is with respect to these and other considerations that the various embodiments described below are presented.

SUMMARY

Embodiments of the present disclosure are directed generally towards methods, systems, and computer-readable storage medium relating to, in some embodiments, creating and evaluating lexicons, creating scenarios, creating policies, and creating and training models for evaluation against established datasets. In some embodiments, through use of certain embodiments of the present disclosure, a user can create scenarios based on model(s), lexicons, and non-language features (NLF). The user can, through use of certain embodiments, create polic(ies) which map to the scenario(s) and population.

Some aspects of the present disclosure relate to systems, methods, and computer-readable storage media for configuring a computer system to detect violation conditions from electronic communications.

In one aspect, the present disclosure relates to a computer implemented method which, in one embodiment, includes receiving data associated with an electronic communication; labelling the received data; creating a machine learning model based on the received data; creating a lexicon, where the lexicon represents one or more terms or regular expressions; creating a scenario using the machine learning models and the lexicon, where the scenario represents a violation condition; and configuring a computer system to detect violation conditions in a target dataset using the scenario, where the target dataset represents electronic communications.

In some embodiments of the present disclosure, the step of creating a scenario includes joining the machine learning and the lexicon with Boolean operators.

In some embodiments of the present disclosure, the scenario includes a filter configured to exclude a portion of the target dataset.

In some embodiments of the present disclosure, the filter is configured to exclude portions of the target dataset with certain types of electronic communications.

In some embodiments of the present disclosure, the method includes storing the scenario in a computer readable medium.

In some embodiments of the present disclosure, the method includes comparing the stored scenario to a second stored scenario, and based on the comparison, outputting data representing the differences between the stored scenario and the second stored scenario.

In some embodiments of the present disclosure, the received data includes at least one of text data and metadata associated with the electronic communications.

In some embodiments of the present disclosure, the target dataset includes at least one of text data and metadata associated with the electronic communications.

In some embodiments of the present disclosure, the step of labeling the received data includes determining whether the received data includes a segment of target language.

In another aspect, the present disclosure relates to a non-transitory computer-readable medium storing instructions which, when executed by one or more processors, cause a computing device to perform specific functions. The functions performed include receiving data associated with an electronic communication; labelling the received data; creating a machine learning model based on the received data; creating a lexicon, where the lexicon represents one or more terms or regular expressions; creating a scenario using the machine learning models and the lexicon, where the scenario represents a violation condition; and configuring a computer system to detect violation conditions in a target dataset using the scenario, where the target dataset represents electronic communications.

In some embodiments of the present disclosure, the step of creating a scenario includes joining the machine learning and the lexicon with Boolean operators.

In some embodiments of the present disclosure, the executable instructions further comprise a scenario that includes a filter configured to exclude a portion of the target dataset.

In some embodiments of the present disclosure, the filter is configured to exclude portions of the target dataset with certain types of electronic communications.

In some embodiments of the present disclosure, the executable instructions further comprise, when executed, storing the scenario in a computer readable medium.

In some embodiments of the present disclosure, the computer-executable instructions comprise, when executed, comparing the stored scenario to a second stored scenario, and based on the comparison, outputting data representing the differences between the stored scenario and the second stored scenario.

In some embodiments of the present disclosure, the received data includes at least one of text data and metadata associated with the electronic communications.

In some embodiments of the present disclosure, the target dataset includes at least one of text data and metadata associated with the electronic communications.

In some embodiments of the present disclosure, the step of labeling the received data includes determining whether the received data includes a segment of target language.

In another aspect, the present disclosure relates to a system which, in one embodiment includes one or more processors and at least one memory device storing instructions which, when executed by the one or more processors, cause the system to perform specific functions. The functions performed include: receiving data associated with an electronic communication; labelling the received data; creating a machine learning model based on the received data; creating a lexicon, where the lexicon represents one or more terms or regular expressions; creating a scenario using the machine learning models and the lexicon, where the scenario represents a violation condition; and configuring a computer system to detect violation conditions in a target dataset using the scenario, where the target dataset represents electronic communications.

In some embodiments of the present disclosure, the step of creating a scenario includes joining the machine learning and the lexicon with Boolean operators.

Other aspects and features according to example embodiments of the present disclosure will become apparent to those of ordinary skill in the art, upon reviewing the following detailed description in conjunction with the accompanying figures.

BRIEF DESCRIPTION OF THE DRAWINGS

Reference will now be made to the accompanying drawings, which are not necessarily drawn to scale.

FIG. 1A illustrates a method for creating alerts based on a policy match according to one embodiment of the present disclosure. FIG. 1B illustrates a method of configuring a computer system to detect violations in a target dataset according to one embodiment of the present disclosure. FIG. 1C illustrates a method for increasing the accuracy of a conduct surveillance system according to one embodiment of the present disclosure.

FIG. 2A illustrates various aspects of displayed events, properties, and communications data, in accordance with one or more embodiments of the present disclosure. FIGS. 2B and 2C illustrate various aspects of policies, including scenario, population, and workflow, in accordance with one or more embodiments of the present disclosure.

FIG. 21 illustrates various aspects of policy administration functionality in accordance with one or more embodiments of the present disclosure.

FIGS. 23A-23F illustrates user interfaces for configuring a scenario in accordance with one or more embodiments of the present disclosure. FIG. 23A illustrates a user interface for viewing one or more datasets. FIG. 23B illustrates a user interface for labeling a dataset. FIG. 23C illustrates an annotation applied to a dataset and an interface for applying labels to a dataset. FIG. 23D illustrates a user interface for configuring a lexicon to be applied to the dataset. FIG. 23E illustrates a user interface for evaluating a lexicon. FIG. 23F illustrates a scenario created using the lexicon that was configured in the interface shown in FIG. 23E.

FIG. 26 illustrates various aspects of actioning communications in accordance with one or more embodiments of the present disclosure.

DETAILED DESCRIPTION

Figure 1A:
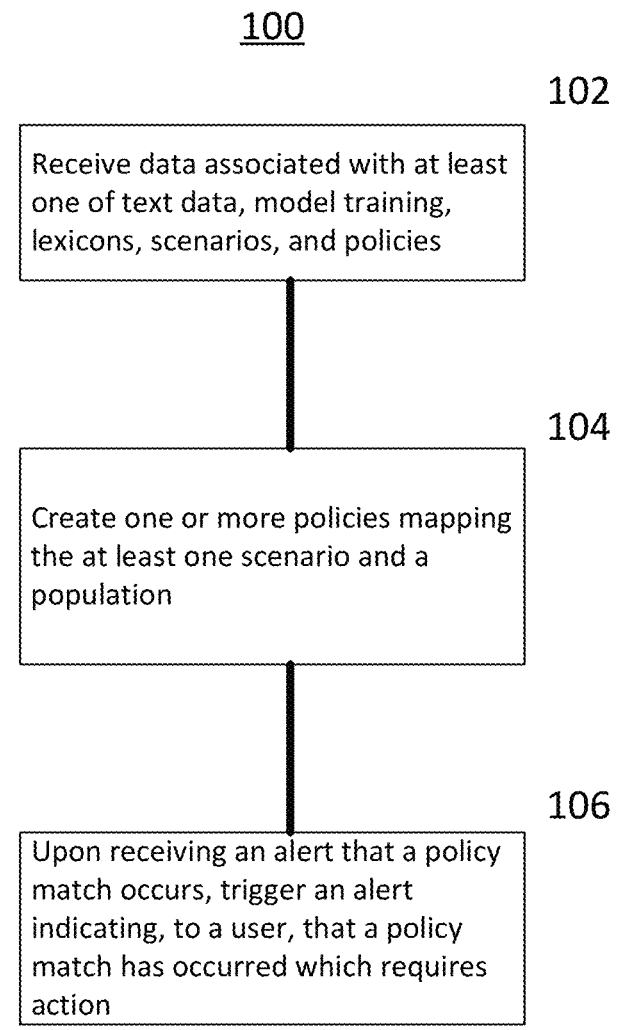
FIGS. 1A-1C illustrate methods according to various aspects of the present disclosure.

Although example embodiments of the present disclosure are explained in detail herein, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

It must also be noted that, as used in the specification and the appended claims, the singular forms "a," "an" and "the" include plural referents unless the context clearly dictates otherwise.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the present disclosure. Similarly, it is also to be understood that the mention of one or more components in a device or system does not preclude the presence of additional components or intervening components between those components expressly identified.

Definitions

The following discussion provides some descriptions and non-limiting definitions, and related contexts, for terminology and concepts used in relation to various aspects and embodiments of the present disclosure.

An "event" can be considered any object with a fixed time, and an event can be observable data that happens at a point in time, for example an email, a badge swipe, a trade (e.g., trade of a financial asset), or a phone call (see also the illustration of FIG. 1).

Figure 2A:
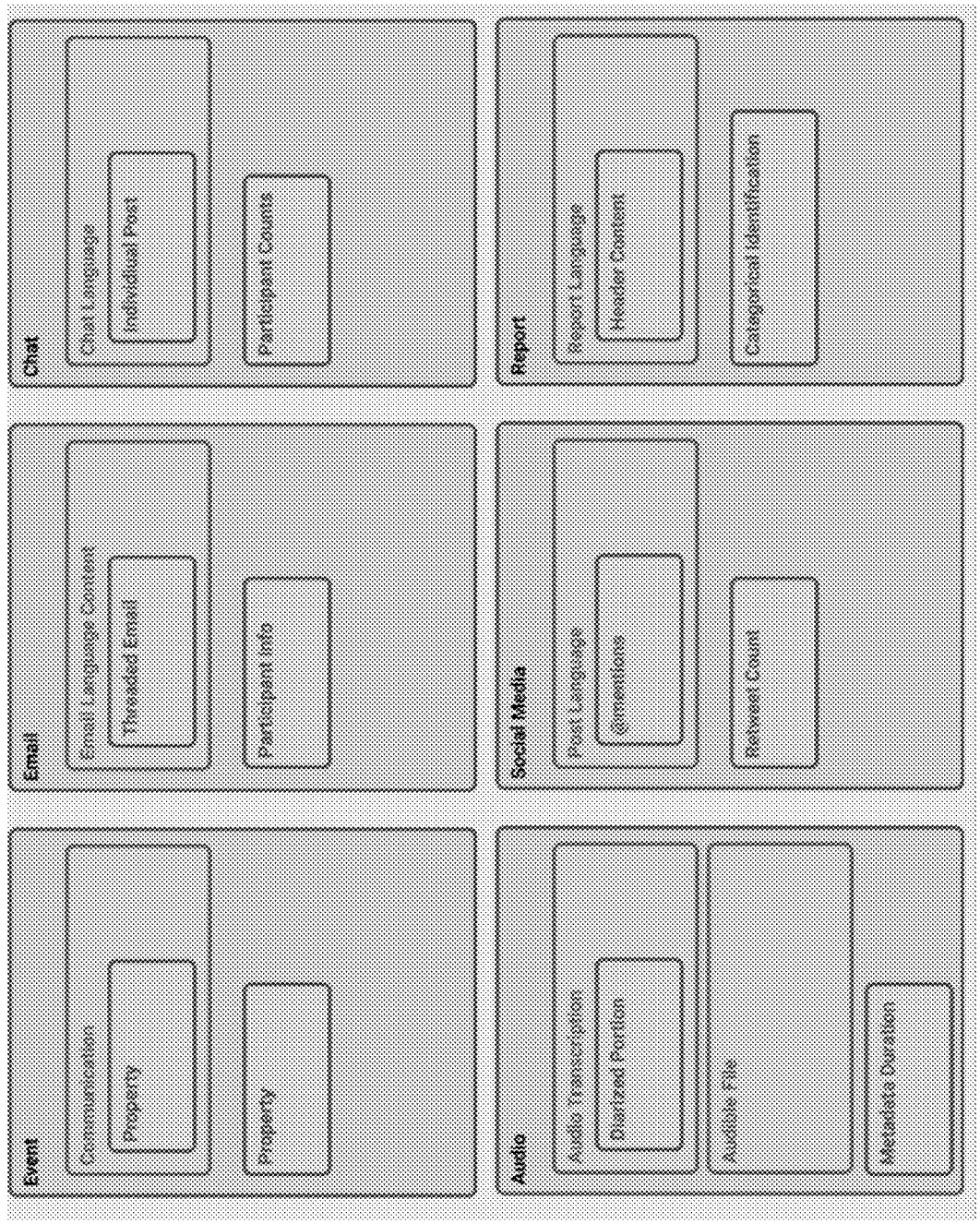
FIGS. 2A-2C illustrate various aspects of the present disclosure.

A "property" relates to an item within an event that can be uniquely identified, for example metadata (see also illustration of FIG. 2A).

A "communication" (also referred to as an "electronic communication") can be any event with language content, for example email, chat, a document, social media, or a phone call (see also illustration of FIG. 2A). An electronic communication may also include, for example, audio, SMS, and/or video. A communication may additionally or alternatively be referred to herein as, or with respect to, a "comm" (or "comms"), message, container, report, or data payload.

A "metric" can be a weighted combination of factors to identify patterns and trends (e.g., a number-based value to represent behavior or intent from a communication). Examples of metrics include sentiment, flight risk, risk indicator, and responsiveness score. A metric may additionally or alternatively be referred to herein as, or with respect to, a score, measurement, or rank.

A "post" can be an identifier's contribution within a communication, for example a single email within a thread, a single chat post, a continuous burst of communication from an individual, or a single social media post (see also illustration of FIG. 2A). A post can be considered as an individual's contribution to a communication.

A "conversation" can be a group of semantically related posts, for example the entirety of an email with replies, a thread, or alternative a started and stopped topic, a time-bound topic, and/or a post with the other post (replies). Several posts can make up a conversation within a communication.

A "signal" can be an observation tied to a specific event that is identifiable, for example rumor language, wall crossing, or language of interest.

Figure 2B:
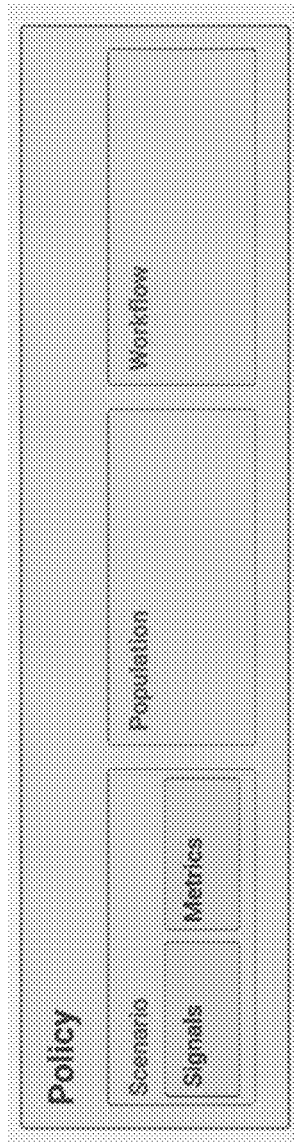
Figure 2C:
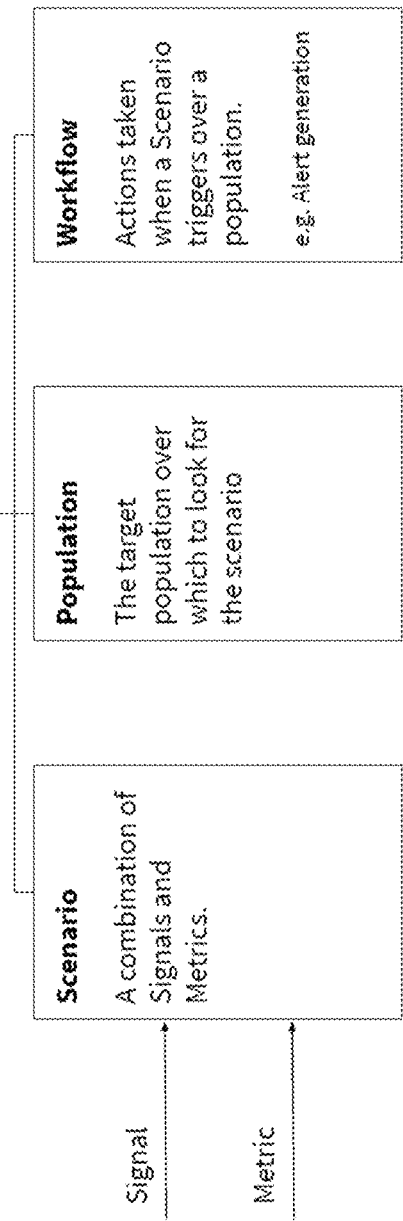

A "policy" can be a scenario applied to a population with a defined workflow. A policy may be, for instance, how a business chooses to handle specific situations, for example as it may relate to ongoing deal monitoring, disclaimer adherence, and/or anti money laundering (AML) monitoring. As used herein, a policy may additionally or alternatively be referred to as, or with respect to, a "KI" or "key indicator", or rules engine. As illustrated in FIGS. 2B and 2C, in some embodiments a policy can be comprised of three items: a scenario as a combination of signals and metrics (as an example of usage, using NLP signals and metrics to discover intellectual property (IP) theft language or behaviors); a population, as the target population over which to look for the scenario (e.g., sales team(s), department(s), or group(s) of persons); and workflow, as actions taken when a scenario triggers over a population (e.g., alert generation).

An "alert" can indicate to a user that a policy match has occurred which requires action (sometimes referred to herein with respect to "actioning" an alert), for example a scenario match. A signal that requires review can be considered an alert. As an example, an indication of intellectual property theft may be found in a chat post with language that matches the scenario, on a population that needs to be reviewed.

A "manual alert" can be an alert added to a communication from a user, not generated from the system. A manual alert may be used, for example, when a user needs to add an alert to language or other factors for further review.

A "hit" can be an exact signal that applies to a policy on events, for example an occurrence of the language "I'm taking clients with me when I leave", a behavior pattern change, and/or a metric change. As used herein, a hit may additionally or alternatively be referred to herein as, or with respect to, a "KI" ("key indicator"), event, and/or highlight.

A "review" can be the act of a user assigning actions on hits, alerts, or communications.

A "tag" can be a label attached to a communication for the purpose of identification or to give other information, for example a new feature set that will enable many workflow practices.

A "knowledge graph" can be a representation of all of the signals, entities, topics, and relationships in a data set in storage. Knowledge graphs can communications, some of which may contain alerts for a given policy. Other related terms may include a "knowledge base." In some embodiments, a knowledge graph can be a unified knowledge representation.

A "personal identifier" can be any structured field that can be used to define a reference or entity, for example "jeb@jebbush.com", "@CMcK", "EnronUser1234", or "(555) 336-2700" (i.e., a personal identifier can include email, a chat handle, or a phone number). As used herein, a hit may additionally or alternatively be referred to herein as, or with respect to, an "entity ID".

A "mention" can be any descriptive string that is able to be referenced and/or extracted, for example "He/Him", "The Big Blue", "Enron", or "John Smith". Other related terms may include "local coreference."

An "entity" can be an individual, object, and/or property IRL, and can have multiple identifiers or references, for example John Smith, IBM, or Enron. Other related terms may include profile, participant, actor, and/or resolved entity.

A "relationship" can be a connection between two or more identifiers or entities, for example "works in" department, person-to-person, person-to-department, and/or company-to-company. Other related terms may include connections via a network graph.

Figure 3:
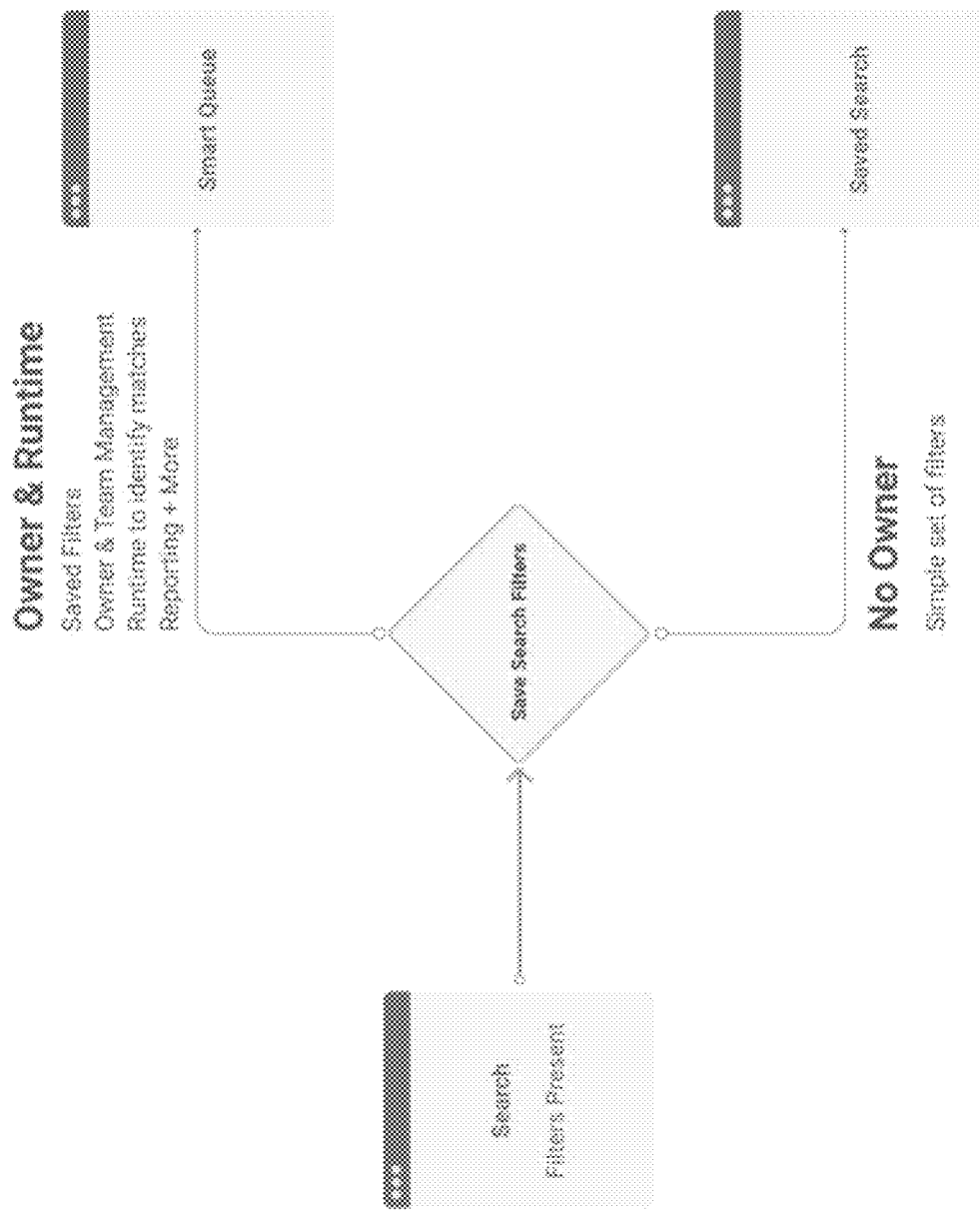
FIG. 3 is a diagram illustrating various aspects relating to workflows in accordance with one or more embodiments of the present disclosure.

The following discussion includes some descriptions and non-limiting definitions, and related contexts, for terminology and concepts that may particularly relate to workflows in accordance with one or more embodiments of the present disclosure, some of which may be further understood by reviewing the diagram of FIG. 3.

A "smart queue" can be a saved set of search modifiers with an owner and defined time, for example, a daily bribery queue, an action pending queue, an escalation queue, or any shared/synced list. As used herein, a smart queue may additionally or alternatively be referred to herein as, or with respect to an action pending queue, analyst queue, or scheduled search.

A "saved search" can be a saved set of search modifiers with no owner, for example a monthly QA check, an investigation search, or an irregularly used search. As used herein, a saved search may additionally or alternatively be referred to herein as, or with respect to a search copy or a bookmark.

The following discussion includes some descriptions and non-limiting definitions, and related contexts, for terminology and concepts that can relate to a graphical user interface (and associated example views as output to a user) that can be used by a user to interact with, visualize, and perform various functionalities in accordance with one or more embodiments of the present disclosure.

Figure 4:
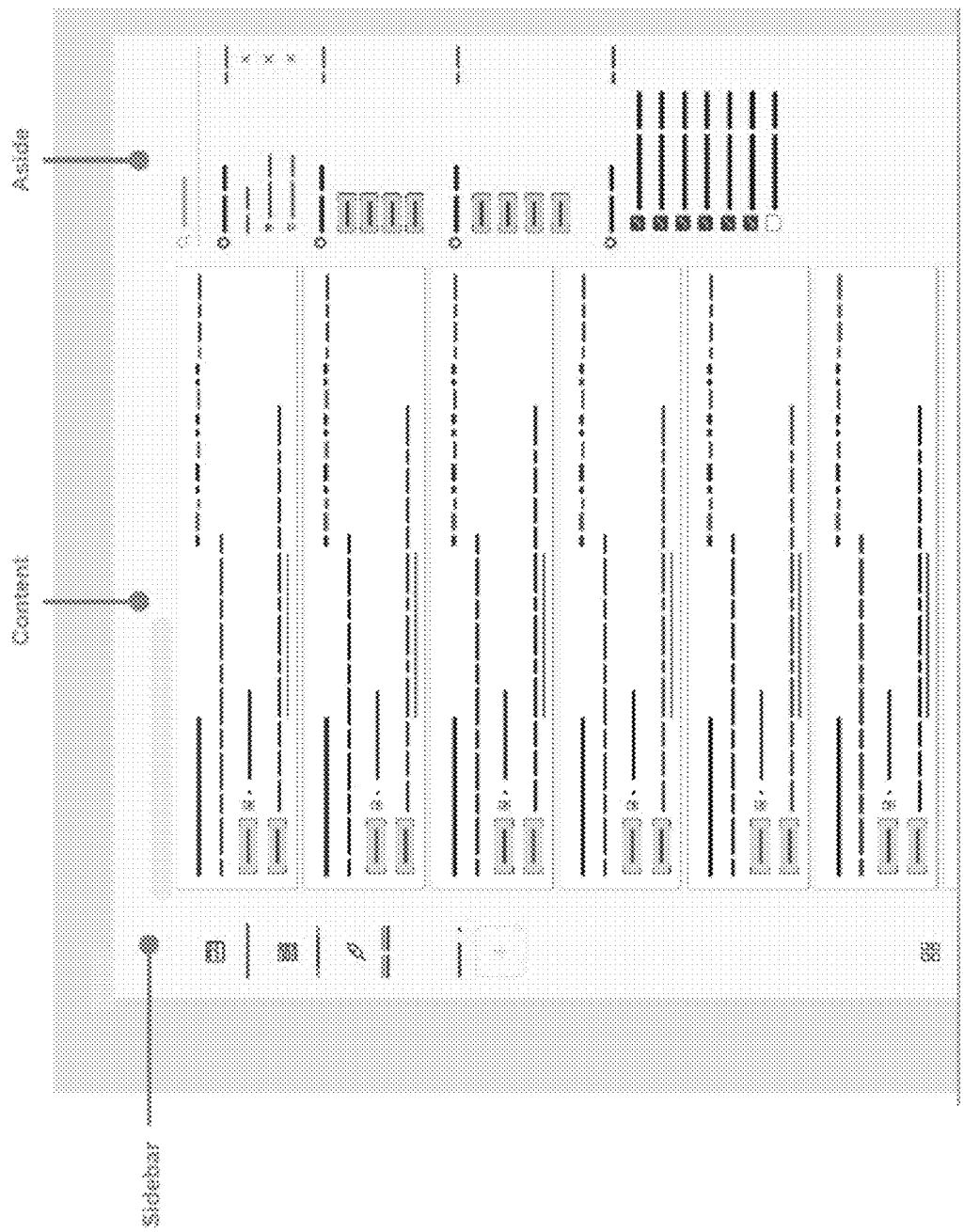
FIG. 4 illustrates various aspects displayed to a user, including elements of a graphical user interface, including sidebar, content, and aside areas, in accordance with one or more embodiments of the present disclosure.

A "sidebar" can be a global placeholder for navigation and branding (see, e.g., illustrations in FIG. 4.

"Content" as shown and labeled in, for example, FIG. 4, identifies where primary content will be displayed.

Figure 8:
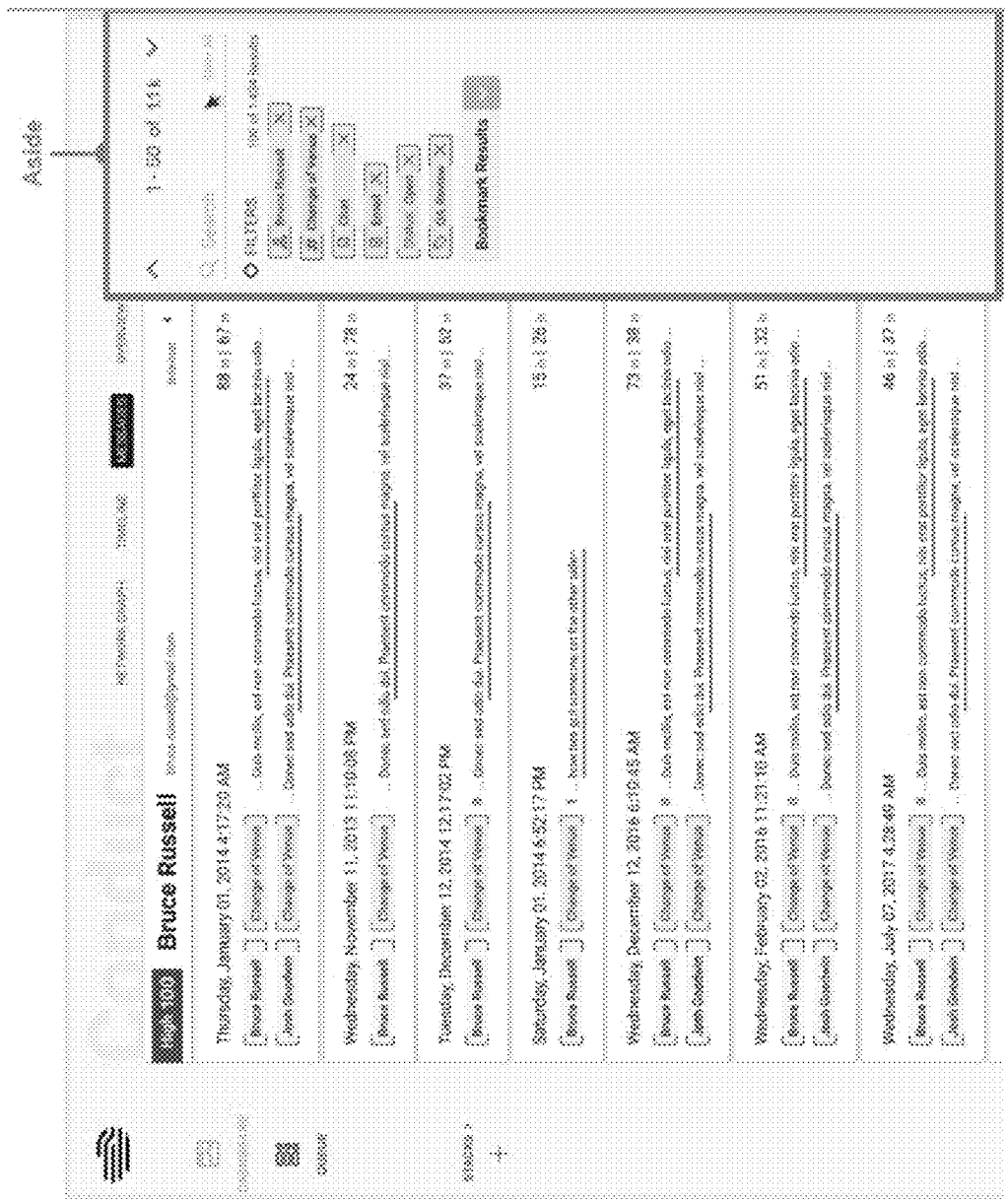
FIG. 8 illustrates a profile view and particularly labels an "aside" section of a displayed graphical user interface, in accordance with one or more embodiments of the present disclosure.

An "aside" as shown and labeled in, for example, FIG. 4, is a location for supportive components that affect the content or provide additional context. Further related aspects of "aside" are shown in the example of FIG. 8. An aside can be a column of components that support, define, or manipulate the content area.

Figure 5:
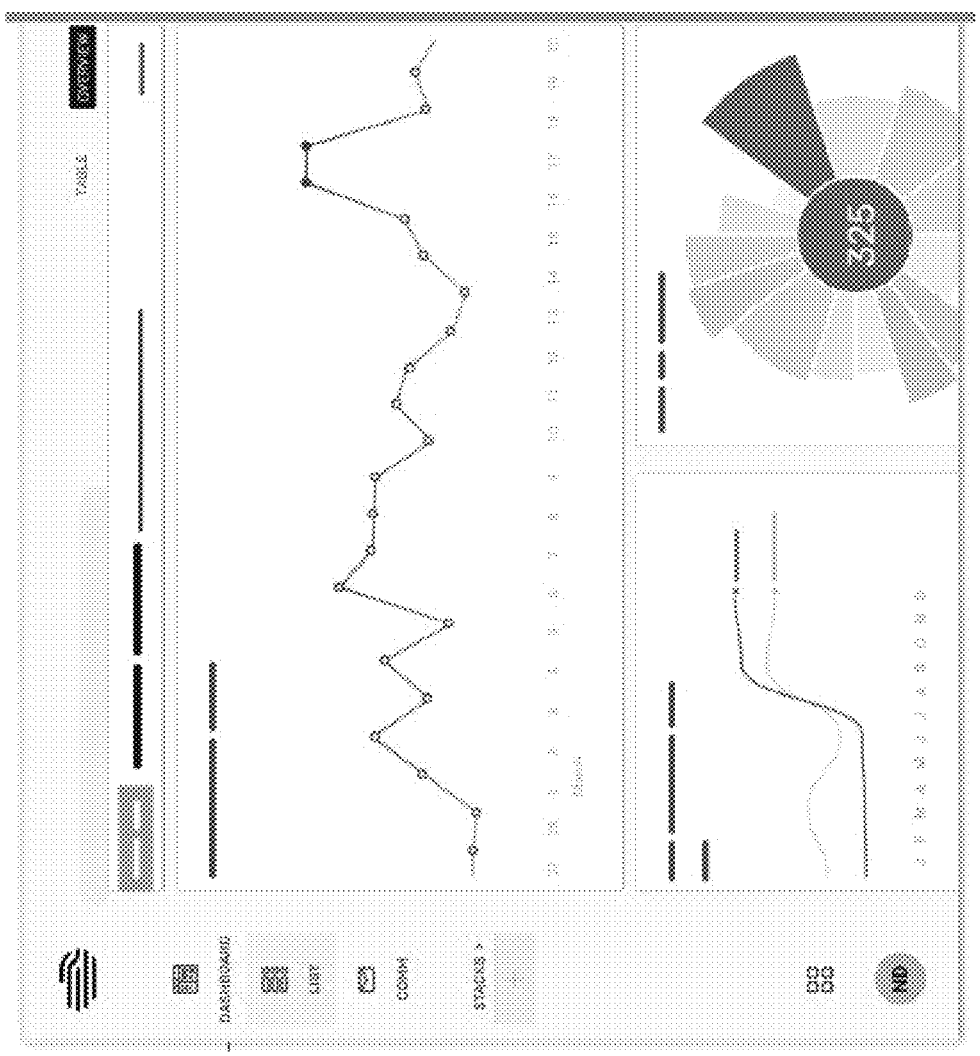
FIG. 5 illustrates a visual view including various data representations beyond simple text, in accordance with one or more embodiments of the present disclosure.

A "visual view" as illustrated in, for example, FIG. 5, can include a chart, graph, or data representation that is beyond simple text, for example communications ("comms") over time, alters daily, queue progress, and/or relationship metric (s). As used herein, visual views may additionally or alternatively be referred to herein as, or with respect to charts or graphs.

A "profile" can be a set of visuals filtered by an identifier or entity, for example by a specific person's name, behavior analytics, an organization's name, or QA department. As used herein, profiles may additionally or alternatively be referred to herein as, or with respect to relationship(s) or behavior analytics.

Figure 6:
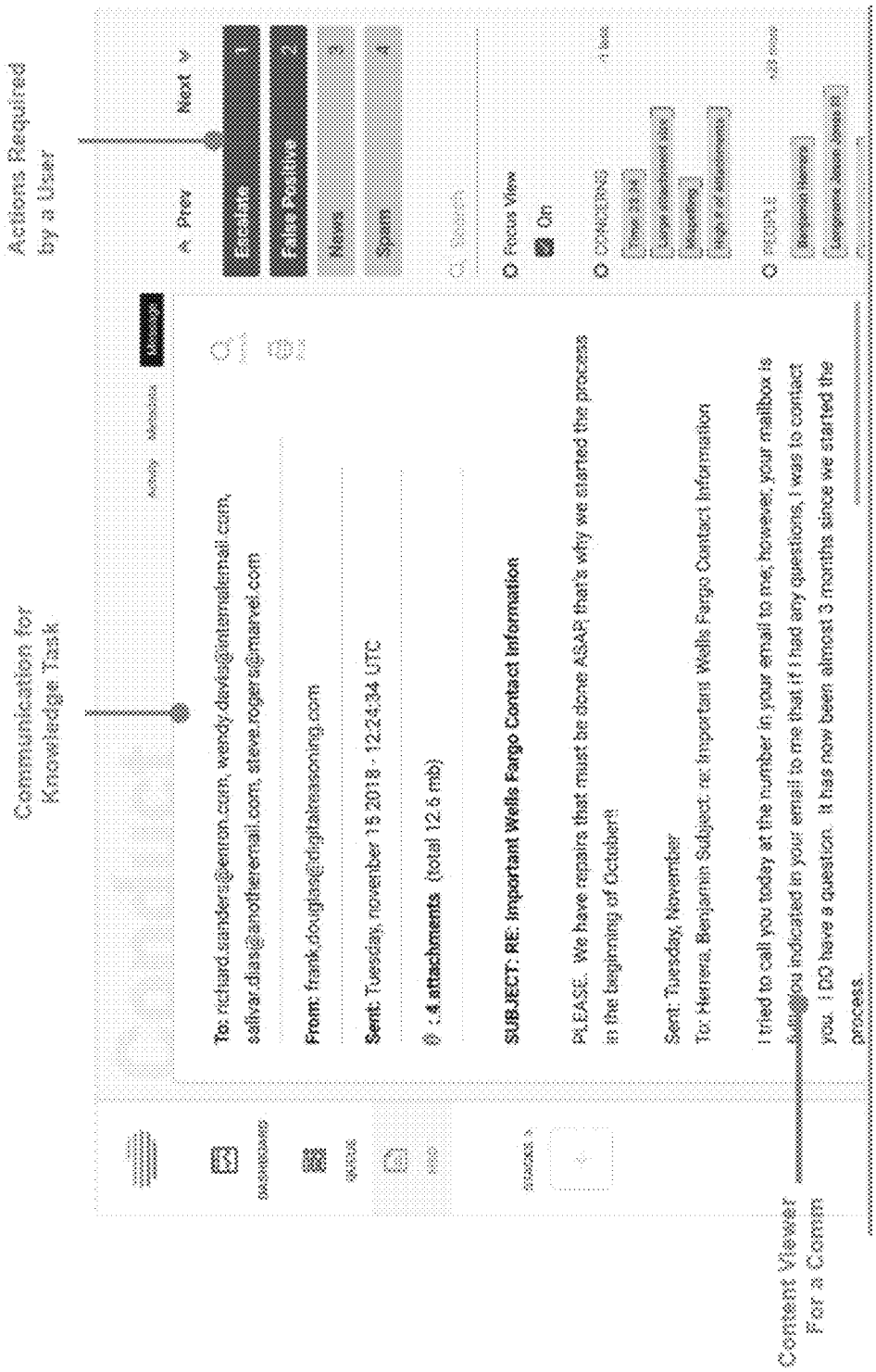
FIG. 6 illustrates aspects of knowledge tasks, in accordance with one or more embodiments of the present disclosure.

Now also referring to the diagram of FIG. 6, smart queues can enable teams to work to accelerate "knowledge tasks". Signals that require review (i.e., alerts), comprise monitoring. These can be from external systems. Knowledge tasks can provide feedback via a "learning loop" into models.

Figure 7:
FIG. 7 illustrates a profile view corresponding to a particular entity, in accordance with one or more embodiments of the present disclosure.

Now also referring to the view in the illustration of FIG. 7, a particular profile view can provide insights such as behavioral insights to, for instance, an entity (here, a particular person). The profile can include a unified timeline with hits, and communications. Also, profiles can provide aggregates of/into entities, metrics, visuals, events, and relationships. As mentioned briefly above and as illustrated in FIG. 8, an aside can be a column of components that support, define, or manipulate the content area.

Figure 9:
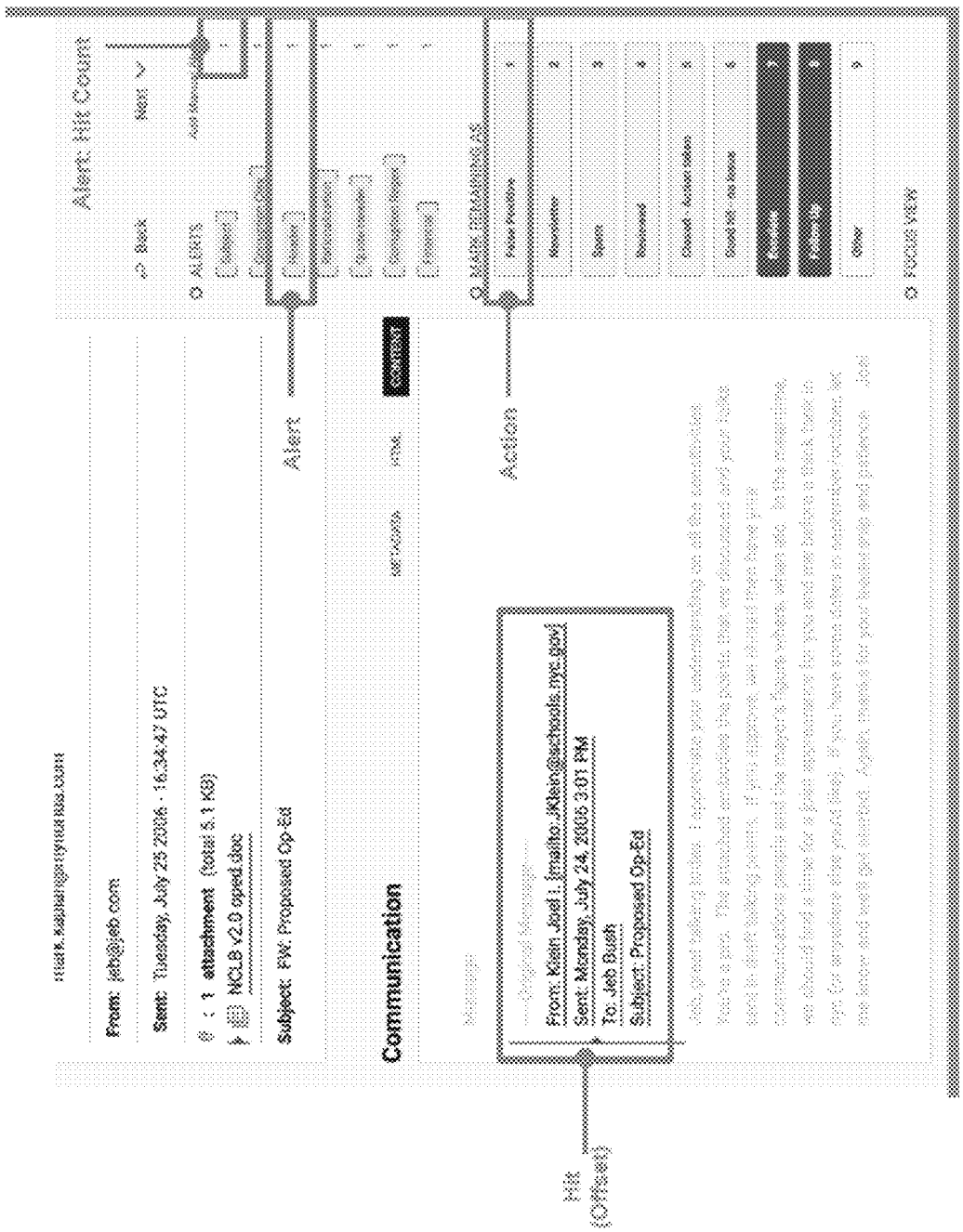
FIG. 9 illustrates various aspects of alerts, hits, and actions, in accordance with one or more embodiments of the present disclosure.
Figure 10:
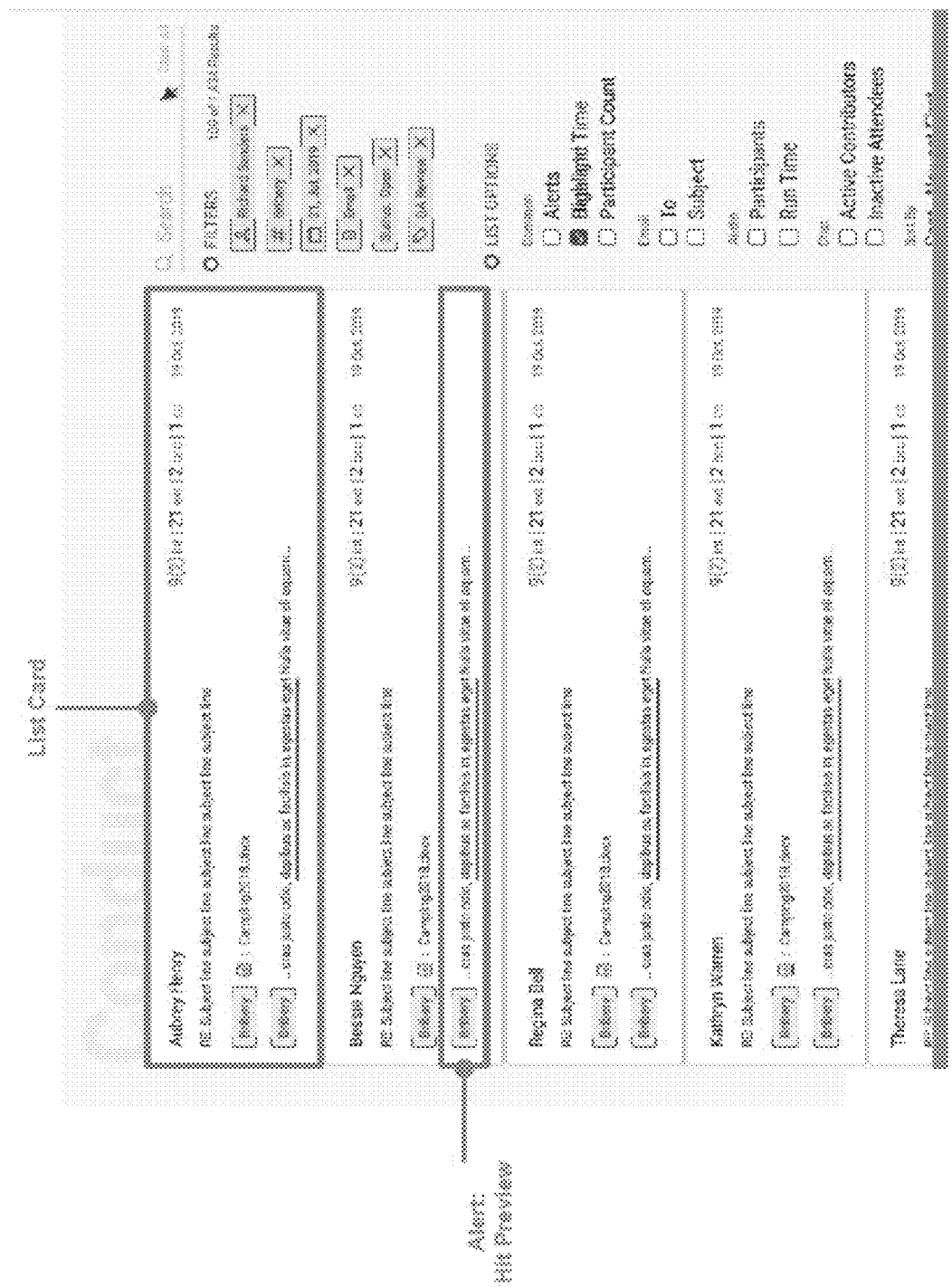
FIG. 10 illustrates various aspects of alert hit previews and list cards, in accordance with one or more embodiments of the present disclosure.

Now referring to the view in the illustrations of FIGS. 9 and 10, and as discussed in some detail above, an "alert" can be the manifestation of a policy on events, and a "hit" (or "alert hit") can be the exact signal that applies to a policy on events. An "action" can be the label that is applied to: a single hit; all hits under an alert; or all hits on a message. A "list card" can be an object that contains a summary of the content of a comm in the "list view", which can be a list of events with communications that may have an alert.

Figure 11:
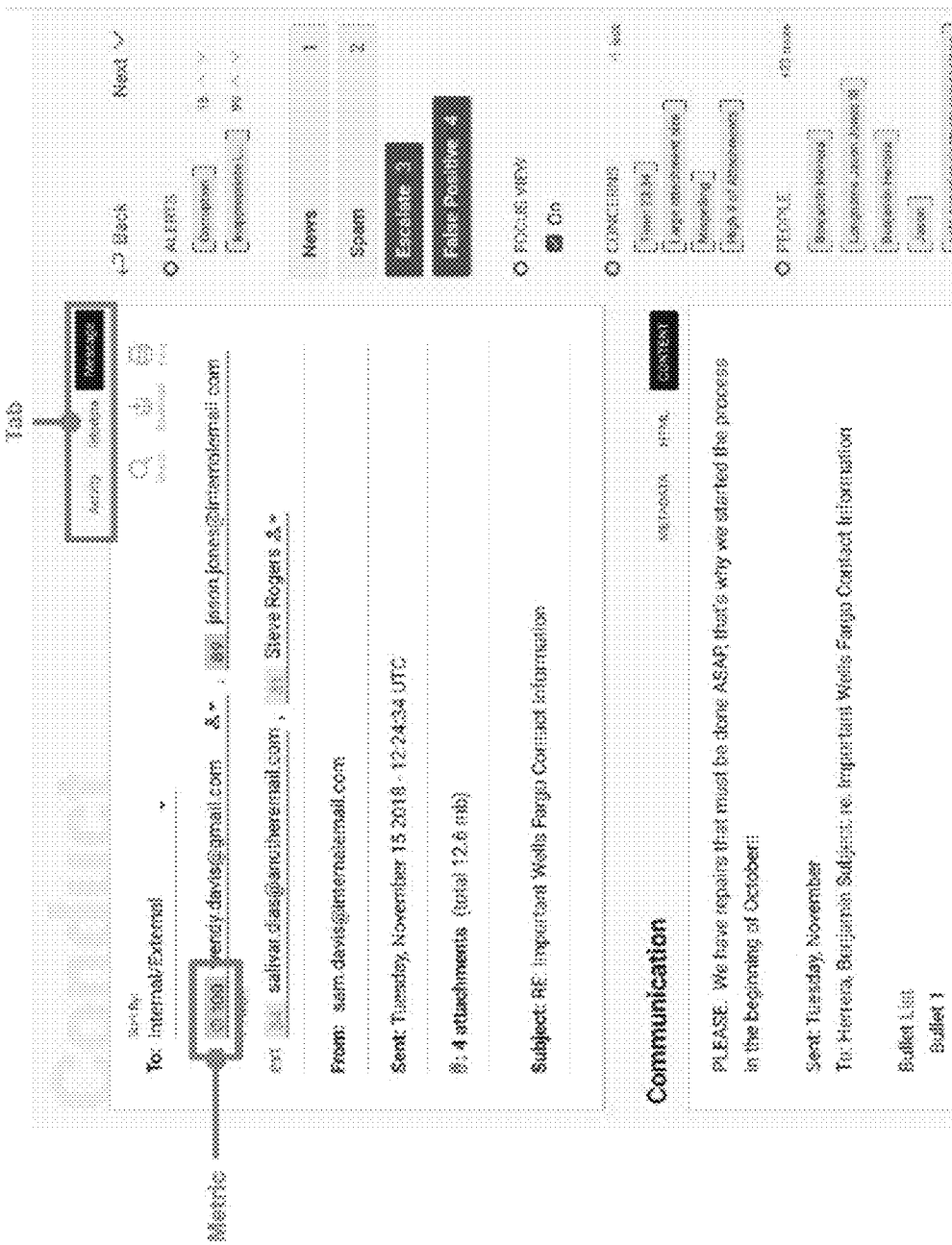
FIG. 11 illustrates various aspects of metrics and tabs, in accordance with one or more embodiments of the present disclosure.

Now referring to the view in the illustration of FIG. 11, as discussed in some detail above, a "metric" can be a weighted combination of factors to identify patterns and trends. A "tab" can be an additional view that can display content related to a current view, for example sibling content.

The following discussion includes some descriptions and non-limiting definitions, and related contexts, for terminology and concepts that may particularly relate to machine learning models and the training of machine learning models, in accordance with one or more embodiments of the present disclosure.

A "hit" can be an exact signal that applies to a policy on events, for example an occurrence of the language "I'm taking clients with me when I leave", a behavior pattern change, and/or a metric change. As used herein, a hit may additionally or alternatively be referred to herein as, or with respect to, a "KI" ("key indicator"), event, and/or highlight.

A "pre-trained model" can be a model that performs a task but requires tuning (e.g., supervision and/or other interaction by an analyst or developer) before production. An "out of the box model" can be a model that benefits from, but does not require, tuning before use in production. Pre-trained models and out of the box models can be part of the building blocks for a policy. As used herein, a pre-trained model may additionally or alternatively be referred to herein as, or with respect to, "KI engines" or "models".

In some embodiments, the present disclosure can provide for implementing analytics using "supervised" machine learning techniques (herein also referred to as "supervised learning"). Supervised mathematical models can encode a variety of different data aspects which can be used to reconstruct a model at run-time. The aspects utilized by these models may be determined by analysts and/or developers, for example, and may be fixed at model training time.

Models can be retrained at any time, but retraining may be done more infrequently once models reach certain levels of accuracy.

The following discussion includes some descriptions and non-limiting definitions, and related contexts, for terminology and concepts that can relate to a lexicon (and associated example views as output to a user) that can be used perform various operations in accordance with one or more embodiments of the present disclosure.

A "Lexicon" can be a collection of terms (entries) that can be matched against text to find language of interest. It can be used as a component of a scenario that searches text for lexical patterns. The lexicon can include a series of terms/entries. A compiled lexicon can be run on a corpus of text in order to generate hits.

"Terms" or "entries" can be strings of characters and operators which implement a search pattern for matching text. Term content should conform to grammar associated with the lexicon.

A "Grammar" can define a syntax for acceptable terms that can be interpreted and compiled into an executable search pattern.

A "Compile Mode" can define how lexicon terms (members of a particular grammar) are transformed into an artifact that can be matched against text in the CSURV runtime environment. For example, a compile mode might specify that the natural language grammar is used and also that Hyperscan is used to execute the term match at runtime.

Description of Example Embodiments of Present Disclosure

A detailed description of various aspects of the present disclosure, in accordance with various example embodiments, will now be provided with reference to the accompanying drawings. The drawings form a part hereof and show, by way of illustration, specific embodiments and examples.

The following provides a non-limiting discussion of some example implementations of various aspects of the present disclosure.

In some embodiments, the present disclosure is directed to a system for indicating to a user when a policy match has occurred which requires action by the user. The system can include a processor and a memory configured to cause the processor to perform functions for creating and/or evaluating models, scenarios, lexicons, and/or policies. As a non-limiting example, the processor and memory can be part of the general computing system illustrated in FIG. 12.

Embodiments of the present disclosure can implement the method illustrated in FIG. 1A The instructions stored on the memory can include instructions to receive 102 data associated with text data, model training, lexicons, scenarios and/or policies. Creating and/or evaluating models can include creating a scenario based on the models, lexicons, and non-language features. It should be understood that the scenario can be based on any combination of models, lexicons, and non-language features. As a non-limiting example, the scenario can be based on a single model, but multiple lexicons and multiple non-language features.

As described herein, the model can correspond to a machine learning model. In some embodiments, the machine learning model is a machine learning classifier that is configured to classify text. Additionally, in some embodiments, the model training can include training models for analysis of text data from one or more electronic communications between at least two persons.

The present disclosure contemplates the machine learning training techniques known in the art can be applied to the data disclosed in the present disclosure for model training. For example, in some embodiments, the model training can include evaluating the model against established datasets. As another example, the model training can be based on a user input, for example a user input that labels the data.

The system can be configured to create one or more policies mapping to the scenario and a population. In embodiments with more than one scenario and/or more than one policy, it should be understood that any number of scenarios and/or policies can be mapped to one another. As non-limiting examples, the system can be configured to map multiple scenarios to multiple policies, or multiple scenarios to the same policy or policies.

When the system receives an alert that a policy match occurs, the system can trigger 106 an alert indicating, to a user, that a policy match has occurred which requires action. The policy can correspond to actions that violate at least one of a combination of signals and metrics, a population, and workflow (referred to herein as a "violation")

Additionally, the present disclosure contemplates that the alerts can be reviewed by the user or by a machine learning model. This review can include determining whether the alerts correspond to an actual violation, and can be used to change the scenario, or change any of the parts of the scenario (e.g. models, lexicons, and non-language features).

Figure 12:
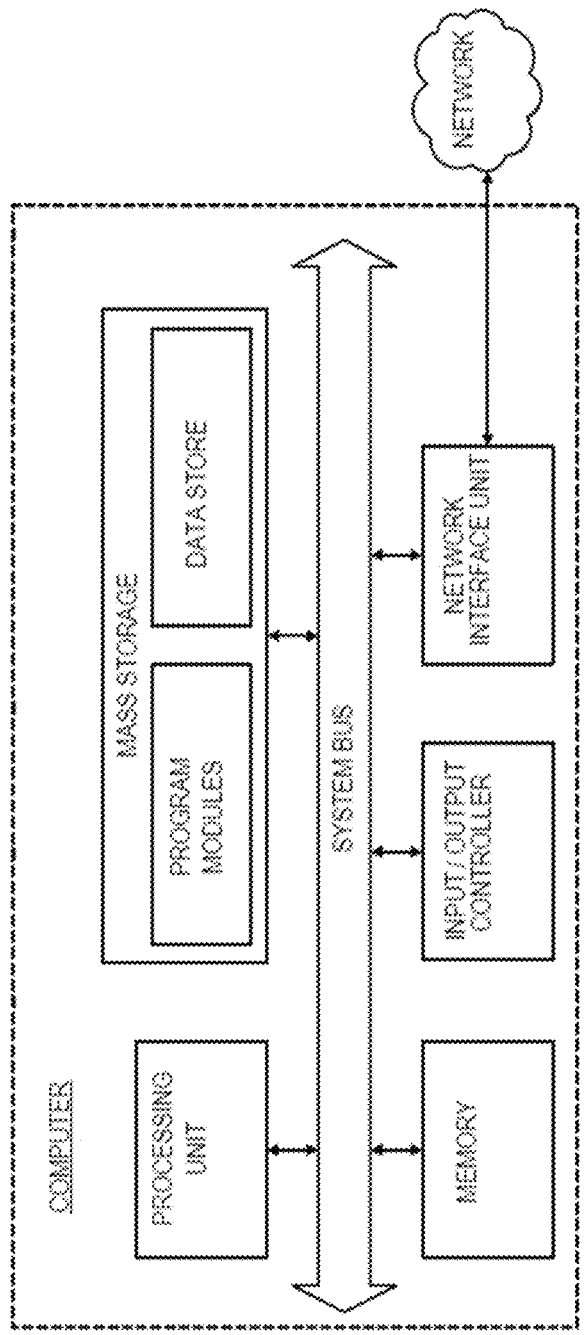
FIG. 12 is a computer architecture diagram showing a general computing system capable of implementing one or more embodiments of the present disclosure described herein.

In some embodiments of the present disclosure, a user can review the data and perform an interaction using a graphical user interface (e.g., a user interface that is part of or operably connected to the computer system illustrated in FIG. 12). The action can include review and interaction by a user via a user interface, which is optionally part of the computing device in FIG. 12. As a non-limiting example, in some embodiments, the system can provide the alert to the user through the user interface, and then the user can confirm or deny the accuracy of the alert using the user interface. Based on the user input, the system can determine whether the alert was a true positive, true negative, false positive, or false negative. The system can use the information about the alerts, including whether the alert was a true positive, true negative, false positive, or false negative, as an input into the system to improve the operation of the system. This can be referred to as "feedback." The present disclosure contemplates that the feedback can be an input into the machine learning model to improve the model training (e.g. the information about the alerts is "fed back" into the model to train the model further). Alternatively or additionally, the present disclosure contemplates that the feedback can be used to change other parameters within the scenario. For example, the feedback can be used to adjust the lexicon or non-language features of the scenario. This can include adding or removing terms from the lexicon, or adding/removing non-language features from the scenario.

As a non-limiting example, a scenario has a pre-trained machine learning model, a target lexicon of regular expressions and text, and a target set of non-language features that includes metadata. In this example, the scenario can be configured to identify communications that correspond to the machine learning model and lexicon, where the metadata shows that the communication is from a time span of the previous two years. The system can then produce alerts by determining whether each of the communications in the dataset is a policy match with the scenario. The user can review the communications that are a policy match with the scenario, and determine whether each communication is a violation, and input those results into the system. Then, based on those results, the system can be configured to change the scenario to improve the effectiveness of the scenario. This can include maximizing or improving certain measures of accuracy such as the ROC curve described herein, the true positive rate, precision, recall, or confusion matrix. As a non-limiting example, this can include changing the scenario to target metadata in a shorter timeframe, e.g., by changing it from two years to one year. The system and/or the user can then use one or more of the measures of accuracy (e.g., the true positive rate) to see if the measure of accuracy has improved after changing the scenario. By monitoring the accuracy of the scenario as the scenario is changed, it is possible to tune the scenario to improve the measures of accuracy. Again, these are merely non-limiting examples of techniques for measuring the error rate, and it will be understood to one of skill in the art that any techniques for measuring error rate that are known in the art can be used in combination with the system and methods disclosed herein.

Figure 1B:
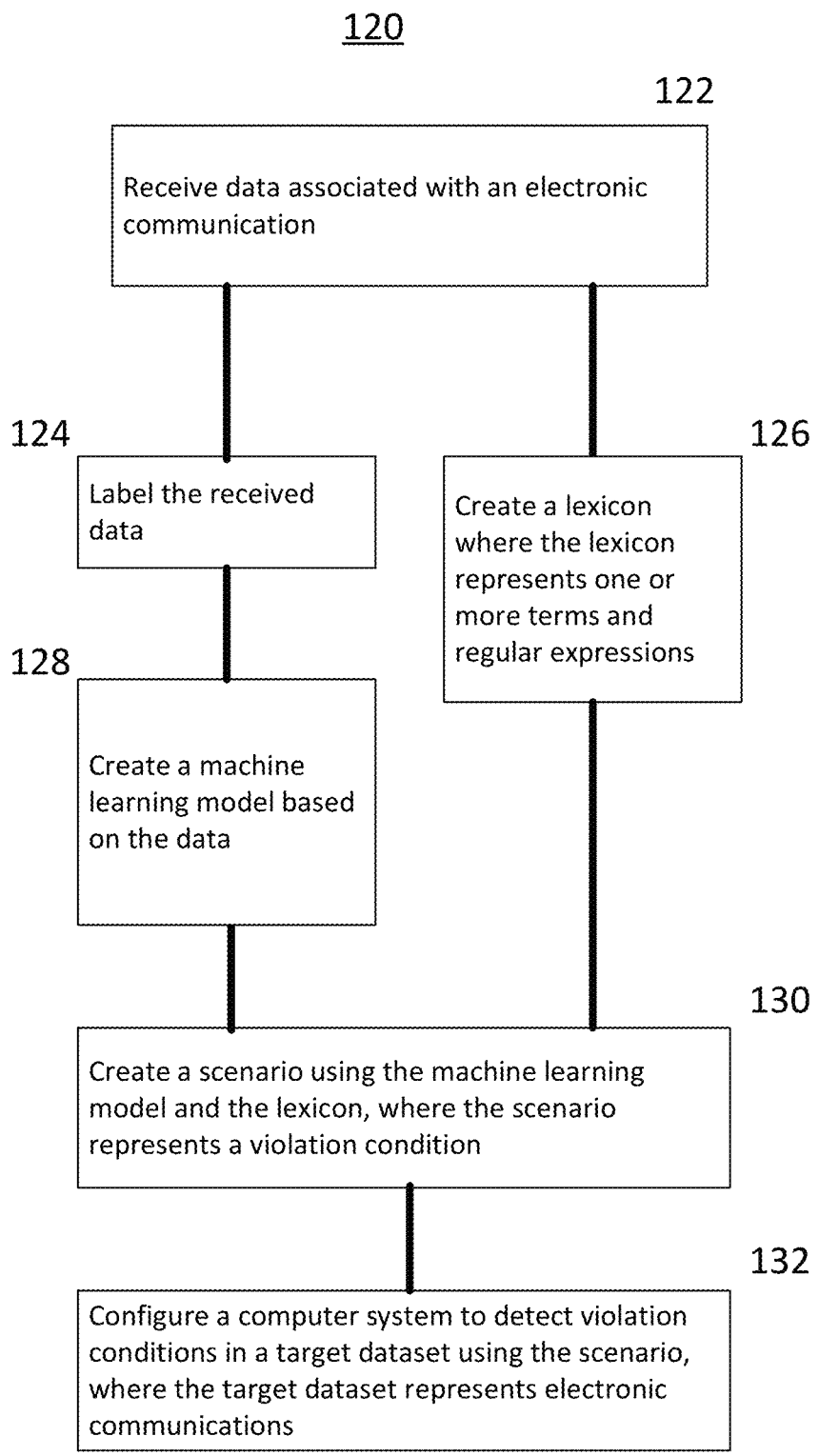

Embodiments of the present disclosure can also include computer implemented methods for configuring a computer system to detect violations in a target dataset. With reference to FIG. 1B, the method 120 can include receiving 122 data associated with an electronic communication. The received data can include text data, and optionally metadata that are associated with one or more communications. As a non-limiting example, the data can include a set of emails, text messages, transcribed phone conversations, or combinations thereof. This data can also include "metadata" that can correspond to any information about the communication that is not found in the text itself.

At step 124, the received data can be labeled. Again, the received data can include text data and/or metadata associated with an electronic communication. As described throughout the present disclosure, labeling can include applying a label indicating whether the one or more communications that are part of the data correspond to a violation. Labeling can also include determining whether the received data includes a segment of target language, and applying a label to the parts of the data that contain that segment of target language. As a non-limiting example, this can include labeling certain communications in the dataset that contain the target language. In some embodiments of the present disclosure the target dataset can include at least one of text data and/or metadata associated with electronic communications.

At step, 128, a machine learning model can be created based on the data. As described elsewhere in the present disclosure, this machine learning model can be a machine learning classifier that is configured to classify text. Additionally, it should be understood that the machine learning model can be any of the other machine learning models described herein, or known in the art.

At step 126, a lexicon can be created for the scenario. As described throughout the present disclosure, the lexicon can represent one or more terms or regular expressions. Optionally, at step 126, the lexicon can be imported partially or completely from a database, or chosen from a list of pre-generated lexicons by a user.

At step 130, a scenario can be created using the machine learning models and the lexicon, where the scenario can represent a violation condition (e.g. a violation of an ethical policy, regulatory policy, rule, law etc., as described in the other examples herein). The user can create the scenario by specifying the model or models that are used, as well as the lexicon or lexicons that are used.

In some embodiments, the scenario can be created 130 using components other than just a machine learning model and lexicon. For example, the scenario can include a filter, where the filter can be configured to exclude or include at least part of the dataset based on the data in the dataset. This can include filtering based on data such as metadata. A non-limiting example of metadata based filtering is filtering the communications based on the type of communication. Again, it should be understood that metadata can refer to any of the properties of a communication that are stored in the data, non-limiting examples of which are the time sent, time received, type of communication, etc.

The user or system can also specify how the models and lexicons are joined together. Again, as a non-limiting example, the scenario can combine one or more models (e.g. machine learning models) and lexicons using Boolean logic (e.g. AND, OR, NOT, NOR). It should be understood that other logical systems and other logical operators can be used in combination with the method disclosed herein.

Optionally, in some embodiments, the scenario can be created based on feedback from actions the user has taken in response to pervious alerts (described herein as "actioning" the alerts). As a non-limiting example, example, based on the actioning, the system can be configured to add or remove lexicons or models from the scenario.

At step 132, the computer system (e.g. the computer system of FIG. 12) can be configured to detect violation conditions in a target dataset using the scenario. This can include storing the scenario in a computer readable medium, receiving additional data for review, and determining whether the additional data contains communications that match the scenario (i.e. that are a "policy match").

In some implementations, the scenario can be configured to allow for a user to easily configure the scenario. The system can be configured to prevent a user from changing the machine learning model, but enable the user to change parameters other than the model. This can allow the user to change the scenario and the type of communications identified by the scenario, without requiring knowledge of the machine learning model, or requiring that the model undergo retraining before use. In some embodiments of the present disclosure, techniques that can be used to reduce the error rates or increase the accuracy other than changing the model itself can be referred to as the "augmentation layer." Non-limiting examples of techniques that can be included in the augmentation layer include lexicons, domain exclusion lists, and rules-based filter using metadata (e.g., filtering out alerts based on number of participants or message directionality). The present disclosure contemplates that any or all of the techniques in the augmentation layer can be adjusted based on the dataset.

Furthermore, the present disclosure contemplates that the scenario can be stored in a computer readable medium, for example the memory illustrated in FIG. 12. Similarly, in some embodiments of the present disclosure, more than one scenario can be stored in one or more computer readable medium. The one or more scenarios can be compared to one another, and the system can create an output based on the comparison. In some embodiments of the present disclosure, the comparison can include comparing a stored scenario to a second stored scenario, and outputting data representing the differences between the stored scenario and the second stored scenario. As a non-limiting example, the output based on the comparison can show what parts of the scenario are different, or what parts of the scenario have stayed the same, between the two scenarios. As a non-limiting example, this could include displaying that two scenarios include the same lexicon, but include different models, or different Boolean operators. The output including the difference between the first and second scenario can also include information about the versions of the two scenarios.

Figure 1C:
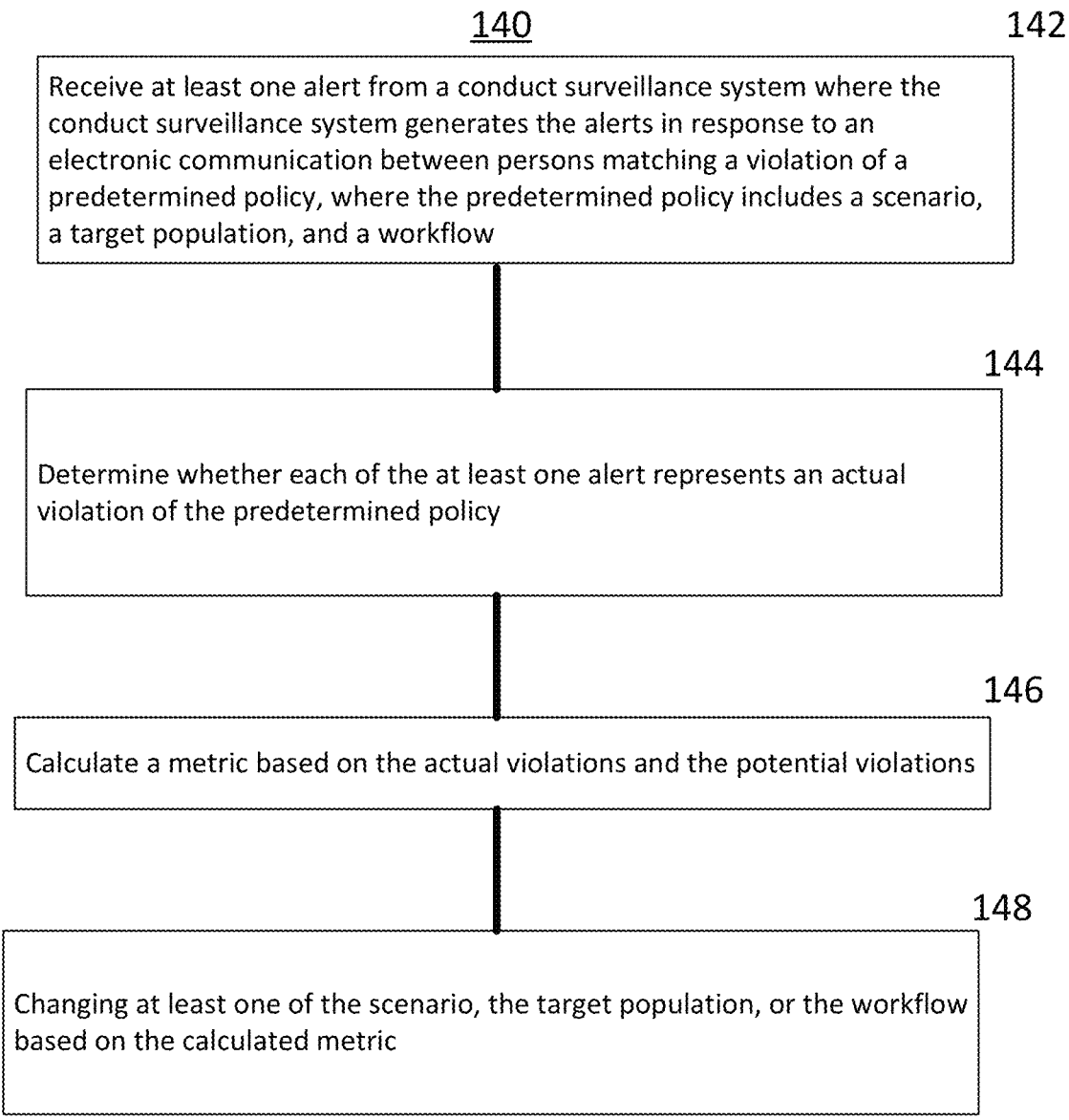

Additionally, some embodiments of the present disclosure are directed to a computer-implemented method 140 for increasing the accuracy of a conduct surveillance system. With reference to FIG. 1C, the method can include receiving 142 at least one alert from a conduct surveillance system. As used in the present disclosure, a "conduct surveillance system" can refer to a tool for reviewing and investigating communications. Again, the alerts can represent a potential violation of a predetermined standard. The conduct surveillance system can generate the alerts in response to an electronic communication between persons matching a violation of a predetermined policy. As described in greater detail elsewhere in the present disclosure, the predetermined policy can include a scenario, a target population, and a workflow.

In some embodiments of the present disclosure, the scenario can include a machine learning classifier. Additionally, in some embodiments of the present disclosure, the scenario can include a lexicon. Again, as described herein, the lexicon can include text and regular expressions.

At step 144, the system can determine whether determining whether each of the at least one alert represents an actual violation of the predetermined policy. As a non-limiting example, if the predetermined policy can configured to detect the dissemination of confidential information. This could represent a violation of a law, regulation, or internal policy. But a communication identified by the predetermined policy as a potential violation may not represent an actual violation of the underlying law, regulation or policy (i.e. a false positive).
In some embodiments of the present disclosure, determining whether each alert represents an actual violation of the policy is referred to as "actioning" the alert. This can include determining whether each of the at least one alert represents an actual violation of the policy, law, or ethical standard that the policy/scenario that generated the alert is configured to detect. Actioning the alert can include displaying the alert to a user and receiving a user input from a user interface representing whether the alert represents an actual violation of the policy.

In some embodiments of the present disclosure, determining whether the at least one alert represents an actual violation can include labeling the alert and using the labeled alert to train the machine learning classifier. As another non-limiting example, the present disclosure contemplates that labeling can include labeling alerts as "good" "bad" and "neutral." Optionally, a "good" alert is an alert that is considered to correctly identify a violation (e.g. a compliance risk), a "bad" alert is an alert that does not correctly identify a violation (i.e. a false positive), and a "neutral" alert is an alert that is not a true or false positive. This can include alerts where there is ambiguity, or insufficient information to determine whether an alert is correct at the time that it is reviewed.

At step 146, the system calculates a metric based on the actual violations and the potential violations wherein the metric comprises a number of false positives in the at least one alert or the number of false negatives in the at least one alert. In some embodiments of the present disclosure, the system can display the metric to the user of the system.

At step 148, the system can change the scenario, the target population, and/or the workflow based on the calculated metric. If the scenario used by the system includes one or more lexicons, changing the scenario can include adding or removing text or regular expressions from the lexicon(s). In some embodiments of the present disclosure, the target population includes a domain exclusion list and changing the target population comprises changing the domain exclusion list.

The present disclosure also contemplates that, in some embodiments, the scenario can include rules for filtering the communication based on the metadata. When the scenario includes rules for filtering the communication based on the metadata, changing the scenario can include changing the rules for filtering the communications based on the metadata. Now particularly referring to the diagram of FIG. 13, a system is shown (and its operational flow), according to one embodiment of the present disclosure. In some embodiments, the system can perform operations for creating and evaluating models, scenarios, lexicons, and policies. The system also can perform operations for training models, for example models used for text analysis. The system in accordance with some embodiments can also provide for a feedback loop such that the results of reviewed alerts can be fed back to components of the system that are used for further training of models (as well as creating and evaluating lexicons, creating scenarios, and creating policies). Some aspects of actioning with respect to alerts are described in U.S. Provisional Patent Application No. 63/160,780 filed Mar. 13, 2021, which is hereby incorporated by reference in its entirety.

Figure 13:
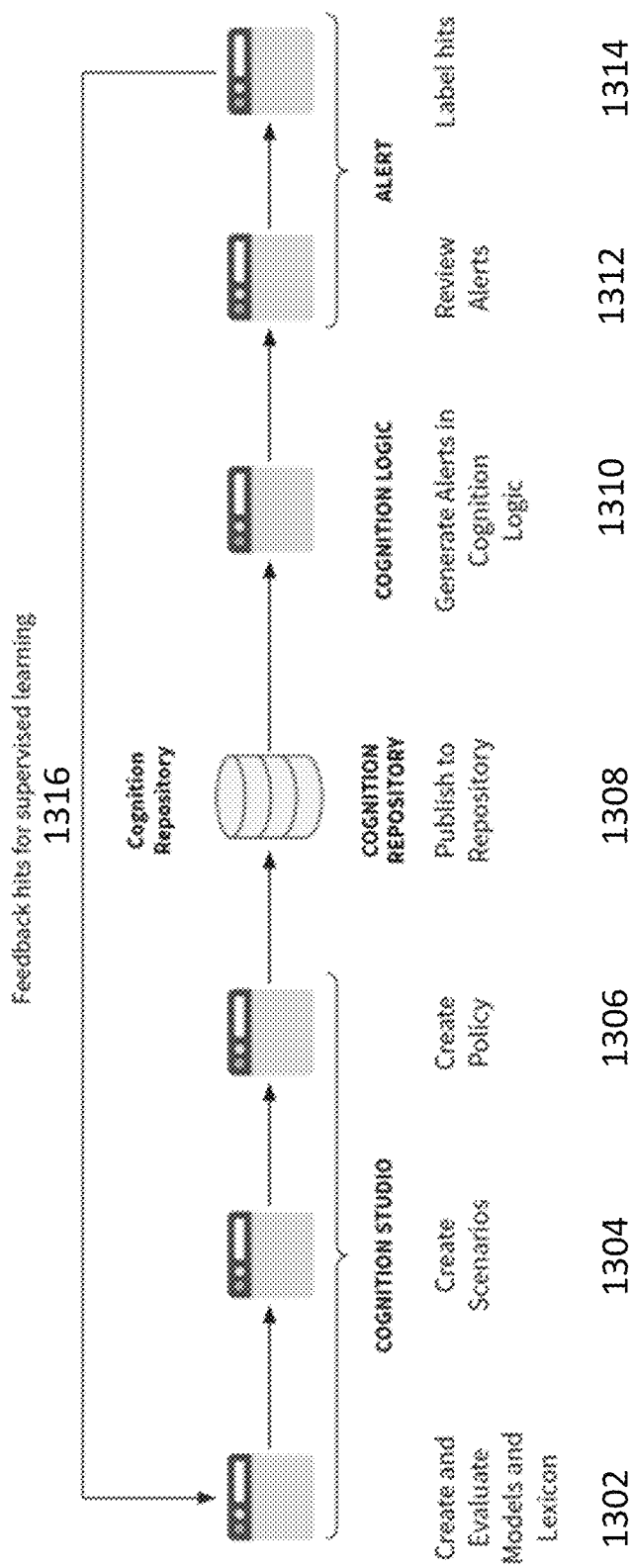
FIG. 13 is a flow diagram illustrating components and operations of a system in accordance with one embodiment of the present disclosure.

In some embodiments of the present disclosure, the system shown in FIG. 13 can be configured to implement one or more of the methods described with reference to FIGS. 1A-1C. As shown in FIG. 13, the system can include modules for creating and evaluating models and lexicons 1302, modules for creating scenarios 1304 and modules for creating policies 1306. In some embodiments of the present disclosure, these three modules can be used alone or in combination to perform the methods described with respect to FIG. 1B. These three modules 1302 1304, 1306 can be collectively referred to as "cognition studio" or a "scenario builder." Optionally, the repository 1308 can be used to store scenarios and/or information about the alerts, models, or labeled data that are described with reference to FIGS. 1A-1C above.

Similarly, as shown in FIG. 13, the system can include modules for generating alerts 1310, reviewing alerts 1312, and labeling hits 1314. In some embodiments of the present disclosure, these modules can be configured to perform part or all of the methods illustrated and described with reference to FIGS. 1A and 1C. Additionally, FIG. 13 also illustrates a feedback path 1316 for how labeled hits can be fed back into "cognition studio" to further improve the scenarios created. Optionally, the present disclosure contemplates that the feedback illustrated in FIG. 13 is the feedback described above with reference to FIGS. 1A and 1C. Through systems and methods in accordance with various embodiments of the present disclosure, creating and evaluating lexicons, creating scenarios, and creating policies (labelled collectively in the diagram of FIG. 13 as "Cognition Studio"), a user (such as a data scientist) can create a model (e.g., perform training of a model) in cognition studio for evaluation against established datasets. The user can then create scenarios based on the model(s), lexicons, and non-language features (NLF). Next, the user can create polic(ies) which map to the scenario(s) and population.

As mentioned in some detail above, in accordance with various embodiments of the present disclosure, a "policy" can be a scenario applied to a population. A policy may be, for instance, how a business chooses to handle specific situations. In some embodiments, a policy can be comprised of three items: a scenario as a combination of signals and metrics, a population, as the target population over which to look for the scenario (e.g., sales team(s), department(s), or group(s) of persons); and workflow, as actions taken when a scenario triggers over a population (e.g., alert generation). An "alert" can indicate to a user that a policy match has occurred which requires action, for example a scenario match. A signal that requires review can be considered an alert.

Following the steps collectively labeled under "Cognition Studio" in FIG. 13, a user such as a business analyst publishes the scenario(s) to a data repository labeled as "Cognition Repository". The repository can be a data storage device that provides for version-controlled storage of all models, lexicons, scenarios, and policies, and which can allow for labeling of active or draft versions. A user such as a system administrator can select relevant scenario(s) and can select a target population. The user can also select target communication types (e.g., chat, email, etc.) and channels (e.g., chat applications, email servers, etc.), and mark the policy as active. The system according to some embodiments can then use a new active policy or policy version against all newly ingested electronic communications to generate alerts as appropriate.

In operations collectively labeled as "Alert" in the diagram of FIG. 13, a user such as an analyst (e.g., compliance representative, etc.) can review the generated alerts and label each hit according to, for instance, escalation workflow in which a true positive is identified. The labeled hits can then be used as feedback to the "Cognition Studio" for supervised improvement of the aspects discussed above with respect to these components and respective functions.

Figure 14:
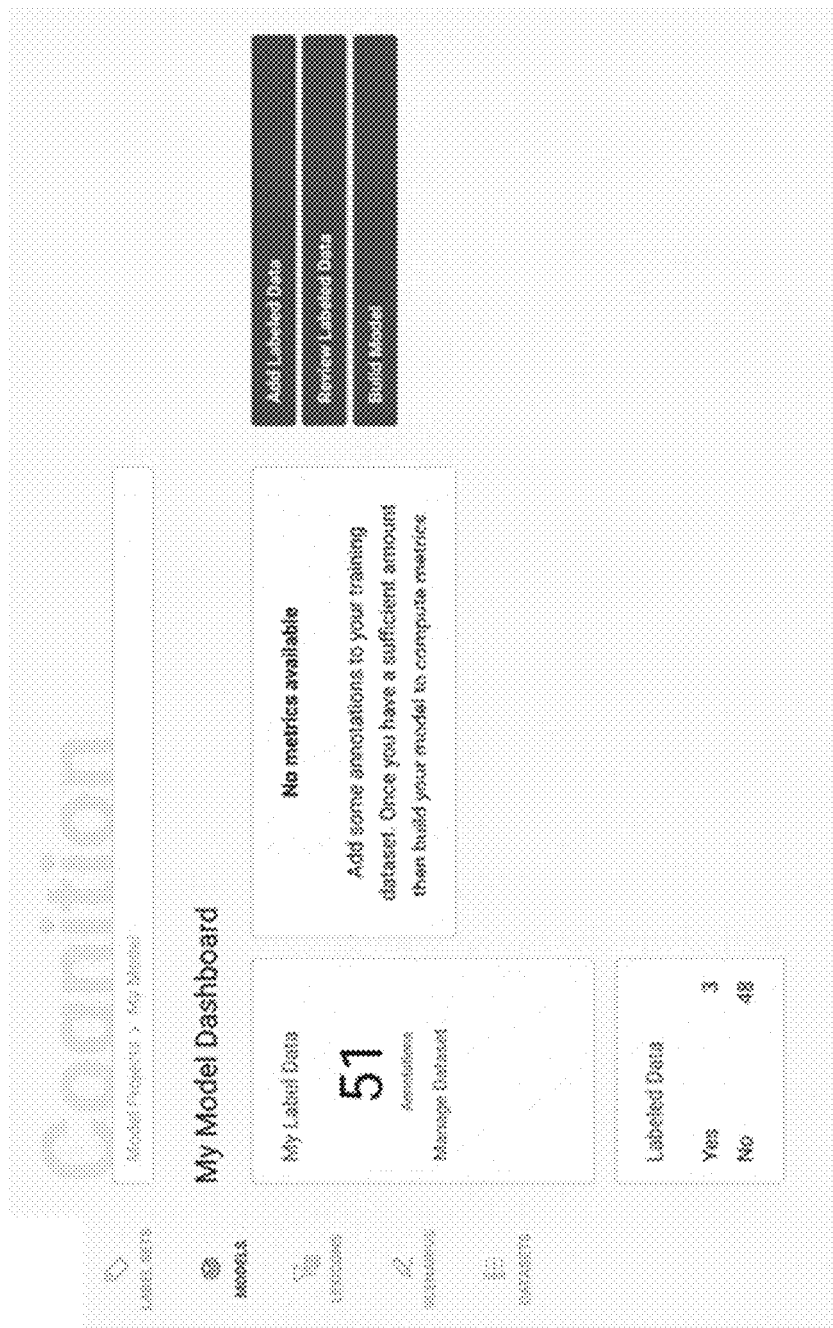
FIG. 14 illustrates various aspects of a model dashboard, in accordance with one or more embodiments of the present disclosure.

Still with reference to FIG. 13, the system can include operations for creating and evaluating models. In some embodiments, the model can be configured for a particular environment. The system, according to some embodiments, can provide the user with statistics related to the model. In some embodiments, the model statistics can be shown as part of a "project dashboard" including information about one or more of the relevant datasets, as shown in FIG. 14. The system can, in some embodiments, also generate and display statistics about the number of labeled samples in the dataset based on the annotations and examples provided in the dataset.

Figure 15:
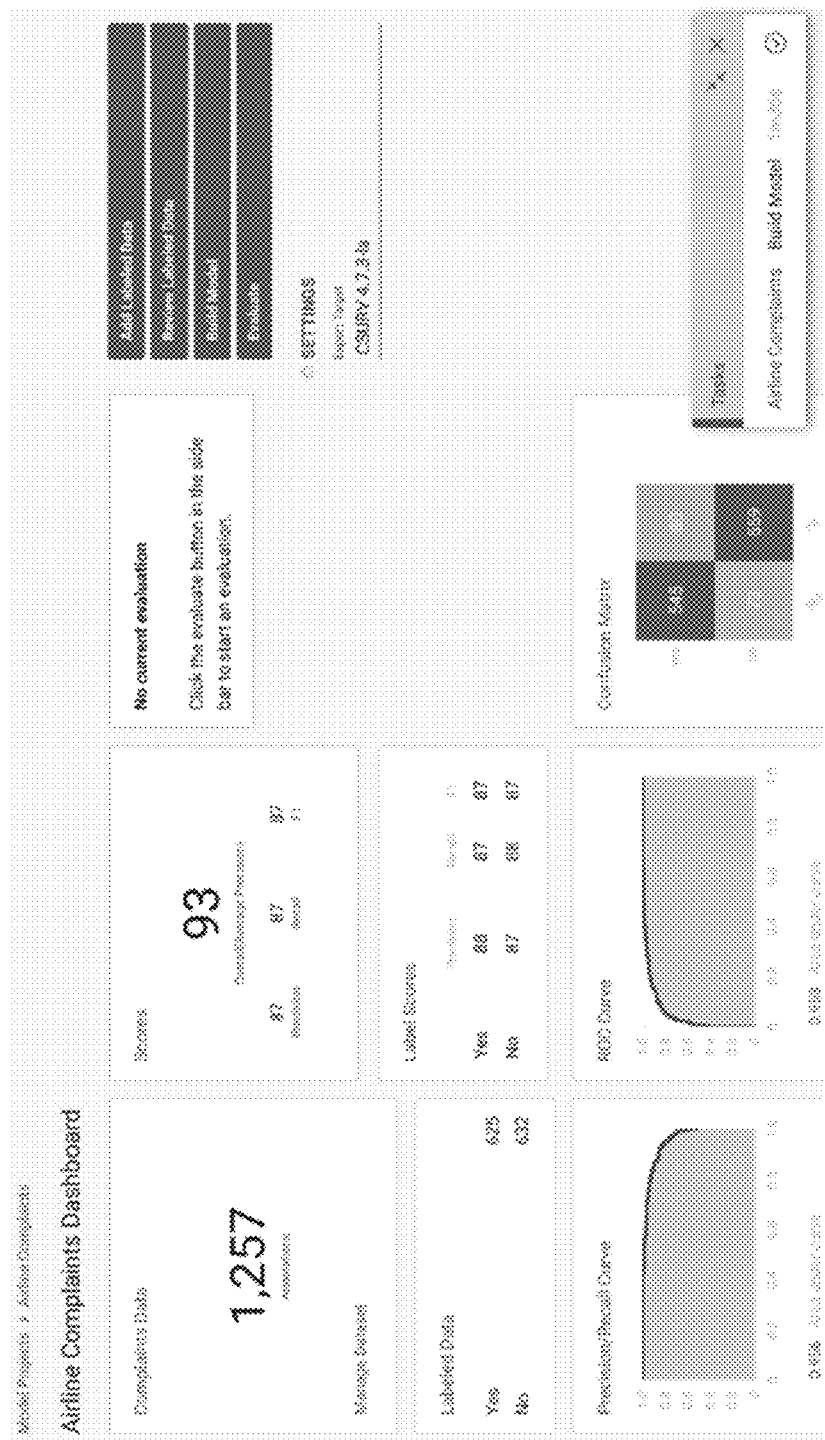
FIG. 15 illustrates various aspects of a model dashboard with statistics, in accordance with one or more embodiments of the present disclosure.

According to some embodiments, the system can provide the user with additional visualizations of the model, as shown in FIG. 15. One visualization is the precision/recall curve, where "precision" can refer to the fraction of relevant instances among the retrieved instances, while "recall" can refer to the fraction of relevant instances that have been retrieved over the total amount of relevant instances. Precision and recall can be used to understand the relevance of the data and/or measure the relevance of the data.

In some embodiments of the present disclosure, an ROC curve can also be created and displayed, as shown in FIG. 15. The ROC curve, and other information about the model can be displayed on a user dashboard. The ROC curve can be a plot of the true positive rate (TPR) against the false positive rate (FPR) at various threshold settings. The true-positive rate can also be known as sensitivity, recall or probability of detection in machine learning. Additionally, in some embodiments, a "confusion matrix" can be created and displayed (also shown in FIG. 15). The confusion matrix can provide a graphical representation of the results of the project database training. Each row of the matrix represents the instances in a predicted class while each column represents the instances in an actual class (or vice versa). A user can determine, based on the confusion matrix, whether the system may be confusing several classes (e.g., commonly mislabeling one as another).

Referring again to FIG. 13, embodiments of the present disclosure can include operations for creating and evaluating lexicons. Embodiments of the present disclosure can allow users to build and maintain lexicons that can be used to generate features for conduct surveillance policies.

In some embodiments, the system can be create, edit, compile, evaluate, and export lexicons. A user can use the system to iteratively refine a lexicon by adding new terms and editing or deleting existing terms. Compiling the lexicon produces a lexicon version that can be saved to a scenario repository and can be evaluated. Evaluation can provide a user with an indication of how effective the lexicon is at finding the types of language that the lexicon designed to detect. A user can build scenarios using saved lexicon versions from a scenario repository.

Users name lexicons and select a grammar for each lexicon. A user can populate the lexicon by uploading a file containing terms to the system (e.g., a .txt file or any other file that can contain text information).

In some embodiments, the system can compile the lexicon. Compiling a lexicon can convert the lexicon terms into a form that can be executed at runtime to find term matches in text. According to some embodiments, the lexicon can be compiled using different compile modes for the lexicon/terms. Optionally a database (e.g., a Hyperscan database) can be built using the lexicon terms as part of the compilation process. Other compile modes (e.g., compile modes using natural language grammar) can preprocess the terms to translate the grammar into an input that is suitable for the backend. This can include regular expressions ("regex"). The compiled lexicon artifact generated can be evaluated or exported by the system/user.

According to some embodiments of the present disclosure, the lexicon can be evaluated against labeled and unlabeled datasets, similar to how models can be evaluated in some embodiments of the present disclosure. Evaluating against labeled data can show how well a lexicon comports with a specific phenomenon that a user wishes to detect. Evaluating against an unlabeled dataset can give a sense for the types and volume of data that will be flagged with lexicon hits.

According to some embodiments of the present disclosure, labeled data can be representative of the phenomena to be detected and typical data, and unlabeled evaluations can result in a very large number of lexicon hits. Therefore according to some embodiments, the user can choose to evaluate using either unlabeled or labeled datasets based on the desired number of lexicon hits or other parameters.

Figure 16:
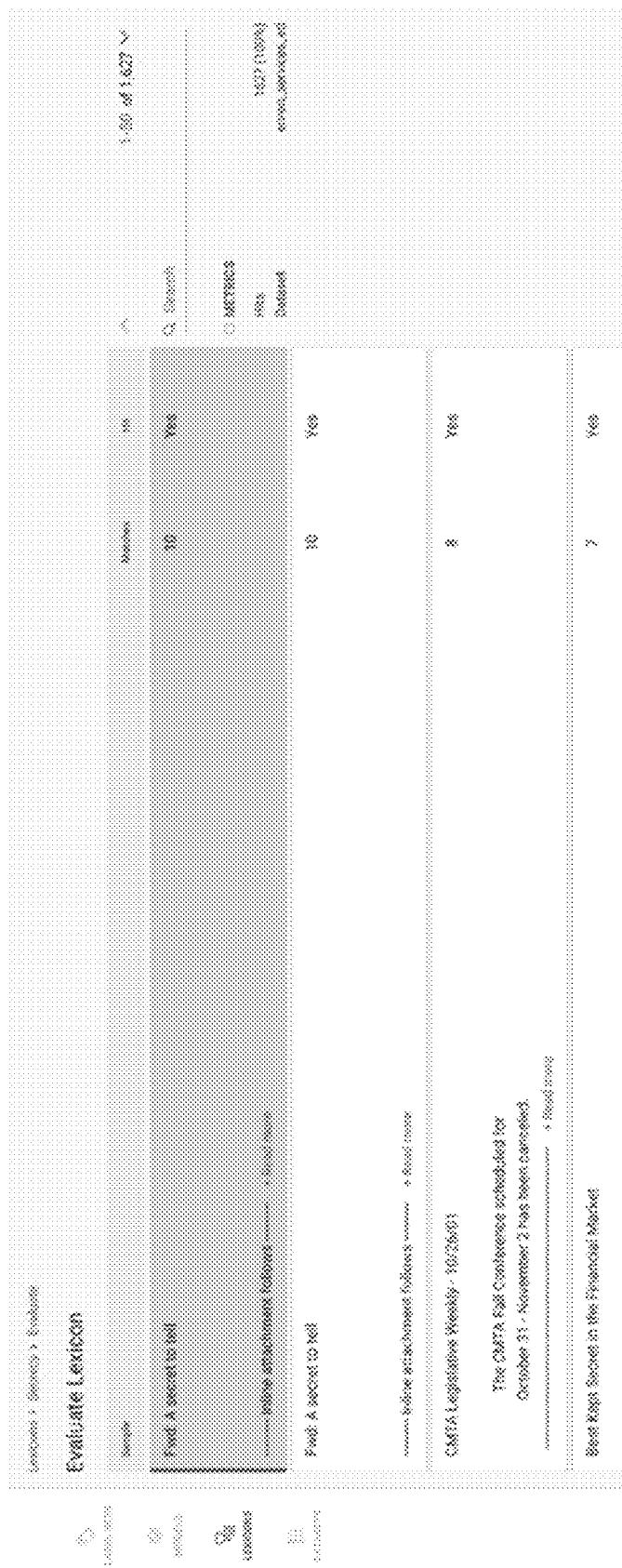
FIG. 16 illustrates various aspects of lexicon evaluation, in accordance with one or more embodiments of the present disclosure.

According to some embodiments of the present disclosure, a system can be used to evaluate a lexicon for labeled or unlabeled datasets, as shown in FIG. 16. The results of the evaluation can be displayed to the user for different labeled and unlabeled datasets. For labeled datasets the system can display a table of the labeled samples in the dataset with columns for sample text and several metrics generated by the lexicon (number of matches, hit status, and agreement status). The samples can be sorted by the number of matches the lexicon found in the sample. The agreement status indicates whether the lexicon results agreed with the labeling from the dataset. Optionally, this assumes that a hit (e.g., a sample with one or more matches) is equitable to a positive label and a miss is equal to a negative label.

Figure 17:
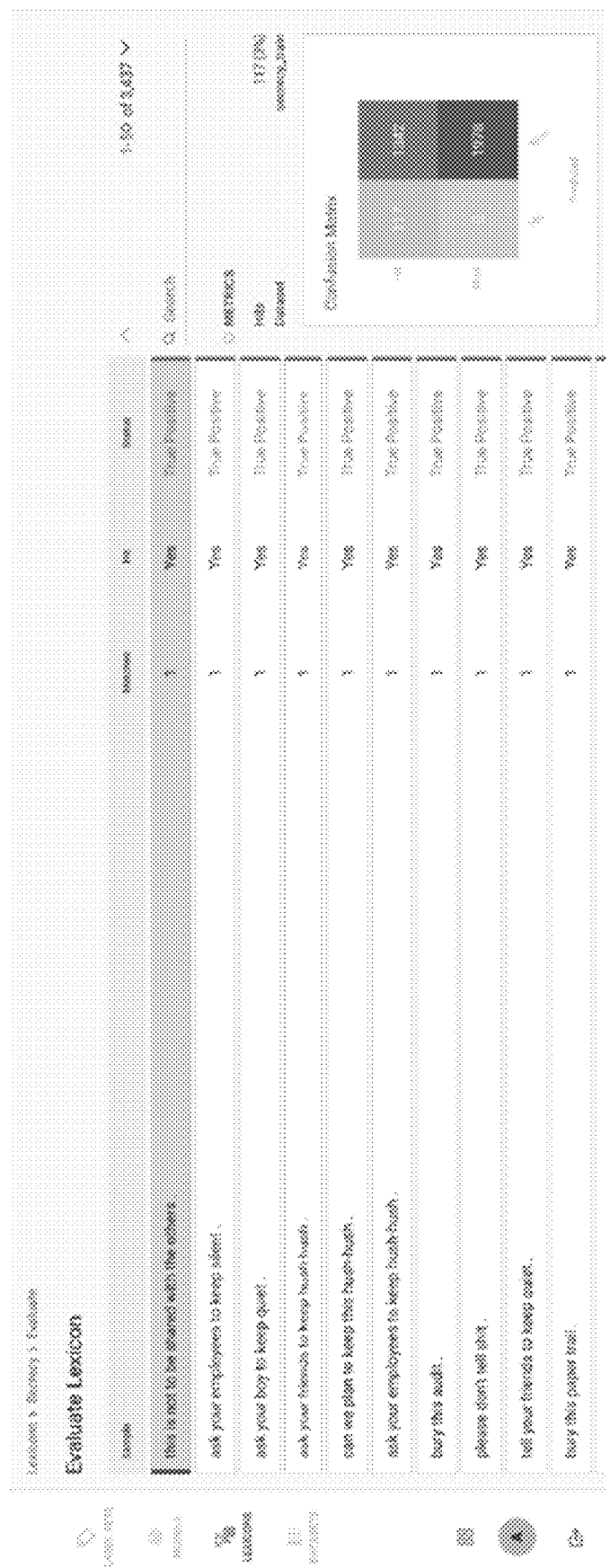
FIG. 17 illustrates various further aspects of lexicon evaluation including a confusion matrix, in accordance with one or more embodiments of the present disclosure.

With reference to FIG. 17, an alternative view of the lexicon evaluation output is shown, according to one embodiment of the present disclosure. As shown, the sidebar for a labeled dataset lexicon evaluation also can contain a confusion matrix showing the distribution of samples based on their agreement status (e.g., True Positive, True Negative, False Positive, False Negative). For unlabeled datasets the system can display a subset of the samples that were hits (e.g., only the first 10 k samples that were hits). When unlabeled data is used, the display may not include the agreement status column or confusion matrix as the samples do not have labels to compare against.

Figure 18:
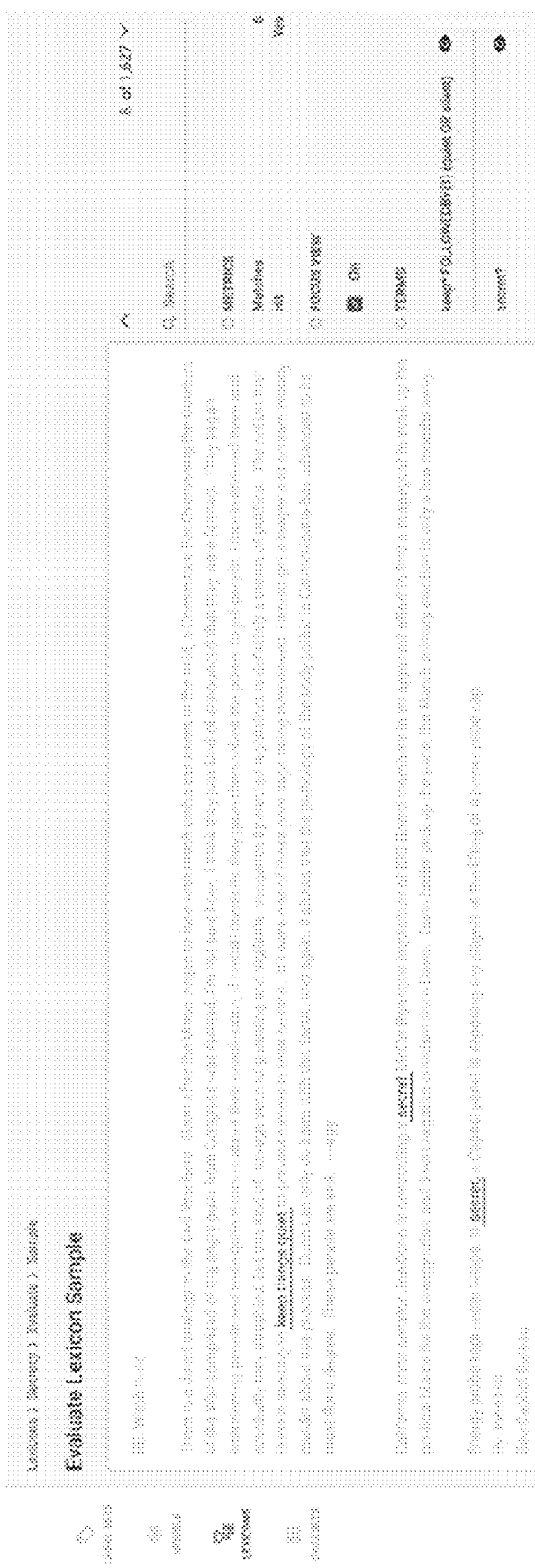
FIG. 18 illustrates various further aspects of lexicon evaluation, in accordance with one or more embodiments of the present disclosure.

As shown in FIG. 18, the system can also display an evaluation sample hit detail view. This can be a focused view which displays a single sample and the exact segments of the sample text that the lexicon terms matched on. The system can visually mark the segments (e.g., by highlighting them with red underlines).

Figure 19:
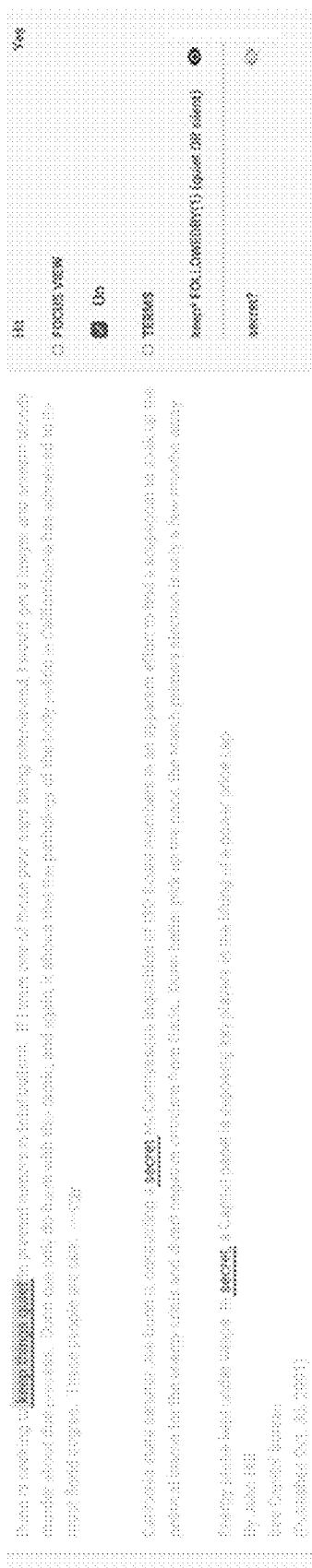
FIG. 19 illustrates various further aspects of lexicon evaluation, in accordance with one or more embodiments of the present disclosure.

In some embodiments of the present disclosure, the sample hit detail view can have two states (Focused and Unfocused). This is illustrated in FIG. 19. The focused state can display the unmatched segments of the sample text in a faded color. This can make it easier to identify the matched segments when a user is scanning the sample. Unfocused state removes the fading so that all text is equally readable. The sidebar of the sample hit detail view lists all of the terms that matched on the sample. The system can adjust the state based on user input. A user can click on an icon (e.g., an "eye" icon) next to a term to cause the system to add an additional red highlight to the segments matched by that term. This additional highlight can be removed by clicking the eye again, or clicking the eye of one of the other terms.

In some embodiments of the present disclosure, the system can include a Compile Mode which can be applied to lexicons. The compile mode can include the following components:
- A Grammar that can determine what strings constitute valid terms and how those should be interpreted.
- A Translation that can transform terms in the lexicon (members of the compile mode's grammar) to an intermediate form that the compile mode's backend(s) can consume.
- One or more Compiler/Backend(s) that can compile the intermediate form into a form that can be executed at runtime by the backend.
- Configuration for the translation and compilation operations. In some embodiments, the configuration is determined at the definition of a compile mode and cannot subsequently be changed. This can ensure that Lexicons using a particular compile mode will always have consistent behavior.
- Normalization/preprocessing to be applied to text before matching against the lexicon terms.

In some embodiments of the present disclosure, the lexicon compile operation leverages the translation and compilation aspects of a compile mode to translate lexicon terms into a runtime executable matching operation. The normalization/preprocessing steps and the executable matching operation can be bundled together in a PMF archive that can be applied in different systems.

At runtime, the PMF archive can apply preprocessing/normalization to inbound text and then match the normalized text against the terms of the lexicon. Any matching spans in text are reported by the PMF archive. The system can also provide the user with a visualization of lexicon performance. The visualization can display to the user the areas of the lexicon that are generating high volumes relative to their effectiveness based on the number of escalations.

Figure 20:
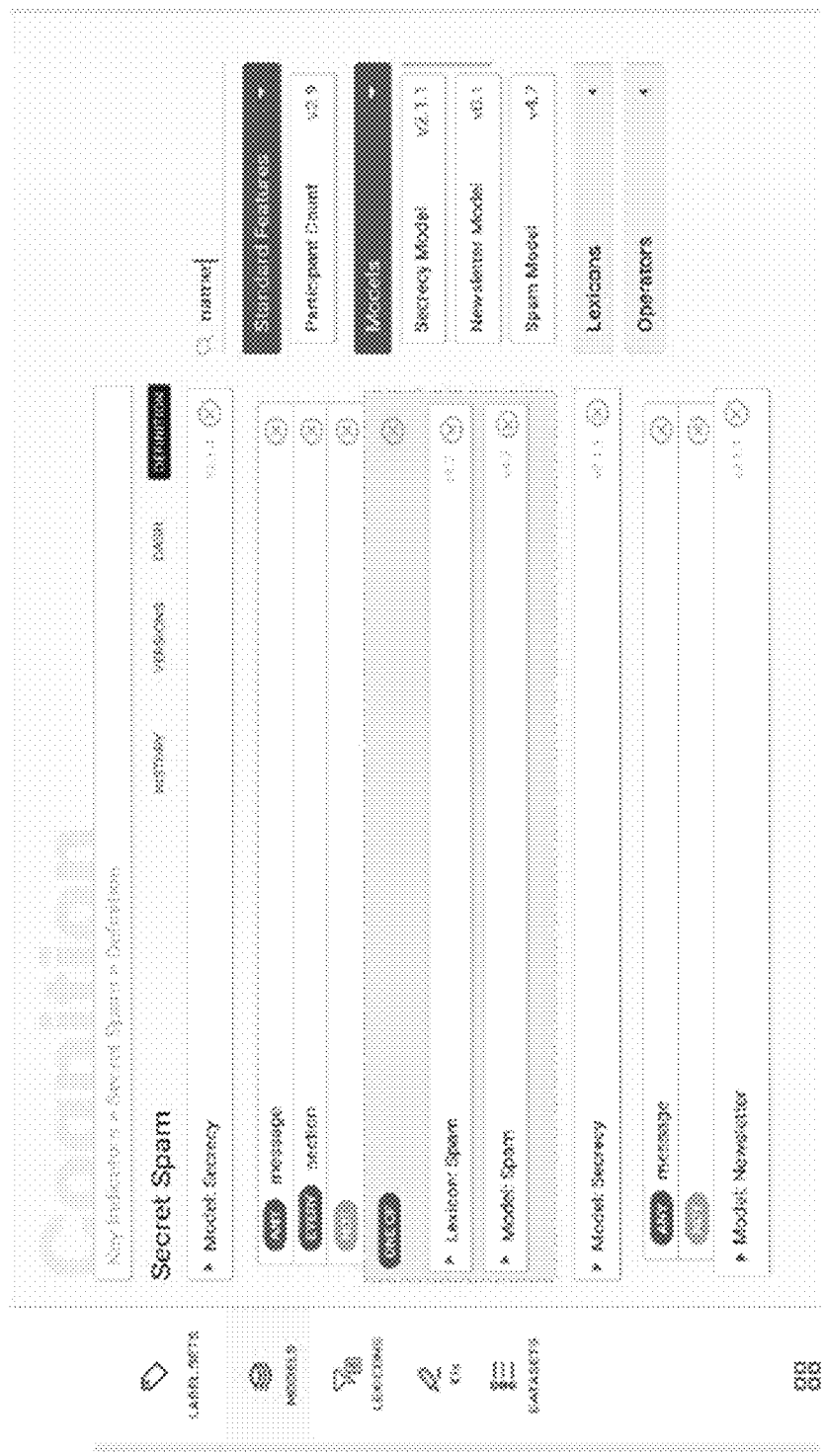
FIG. 20 illustrates various aspects of scenarios in accordance with one or more embodiments of the present disclosure.

With reference to FIG. 20, some embodiments of the present disclosure can include operations related to scenarios. A scenario can be a combination of signals and metrics, which can be added to a policy. Once a scenario is created a user can add skill blocks to its definition, view its change history, and edit the scenario's name and description. The scenario list can also be filtered to facilitate searching.

Grouping blocks attach to skill blocks and modify how that block operates. Specifically, grouping can determine the level of scope at which conditions will be applied. As a non-limiting example, one option is Attachment. If the modifier "Any: Attachment" is applied to an "All of," then all skills within that All Of must be satisfied in the same attachment, and will only generate hits within attachments. The use of other modifiers is contemplated by the present disclosure.

Some embodiments of the present disclosure implement metadata skill blocks. Metadata skill blocks can ignore any grouping conditions that would normally apply to them, because metadata is present at the communication level. The system can be configured so that certain metadata conditions do not hold to this paradigm, and warn users of the behavior of those metadata conditions. Non-limiting examples of metadata skill blocks are "any" and "every." A user can use the Any grouping block to configure the system so that only one instance of the condition within the grouping to trigger. For example, a single attachment or a single chat post. A user can use the "Every" grouping blocks to configure the system so that the condition will only be triggered when all instances of the grouping are present. A non-limiting example use case is, for example, an input case like "Every: Disclaimer." FIG. 20 illustrates a non-limiting example of how Any, Every, and Not Blocks can be used, according to one embodiment of the present disclosure.

Figure 21:
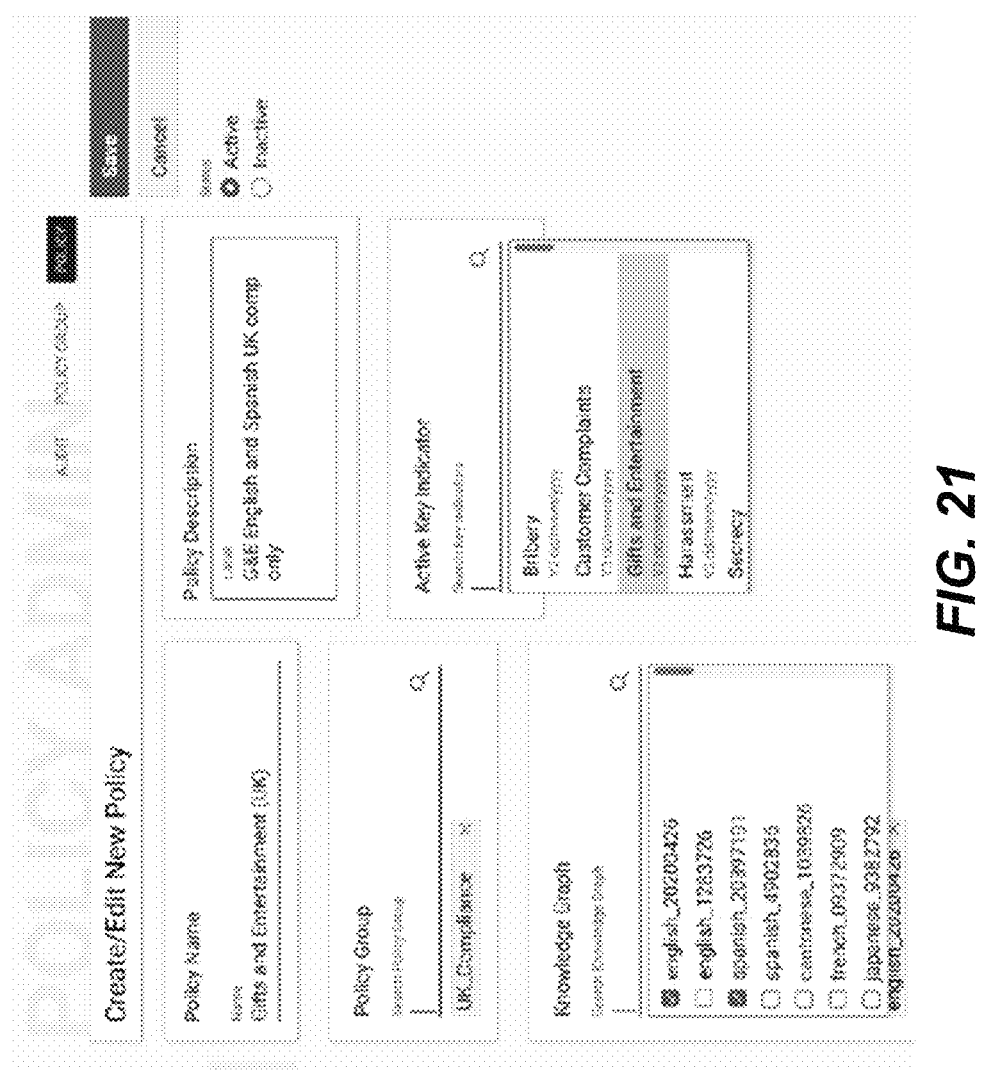

A non-limiting example of a user interface for policy creation or editing is shown in FIG. 21. The system can include operations for policy management, which can increase self-sufficiency for different users (e.g., business and IT teams). Additionally, the system can enable traceability of policies created and activated for audit and historical purposes.

Figure 22:
FIG. 22 illustrates a user interface for accessing a repository in accordance with one or more embodiments of the present disclosure.

With reference to FIG. 22, a user interface for accessing a repository is shown (e.g. the cognition repository 1308 illustrated in FIG. 13) is shown. The user interface can allow a user to browse, search, import, and export models, lexicons, scenarios, and any of the other data stored in the repository. The exported models, lexicons, scenarios, or other data can be referred to as "artifacts."

Figure 23A:
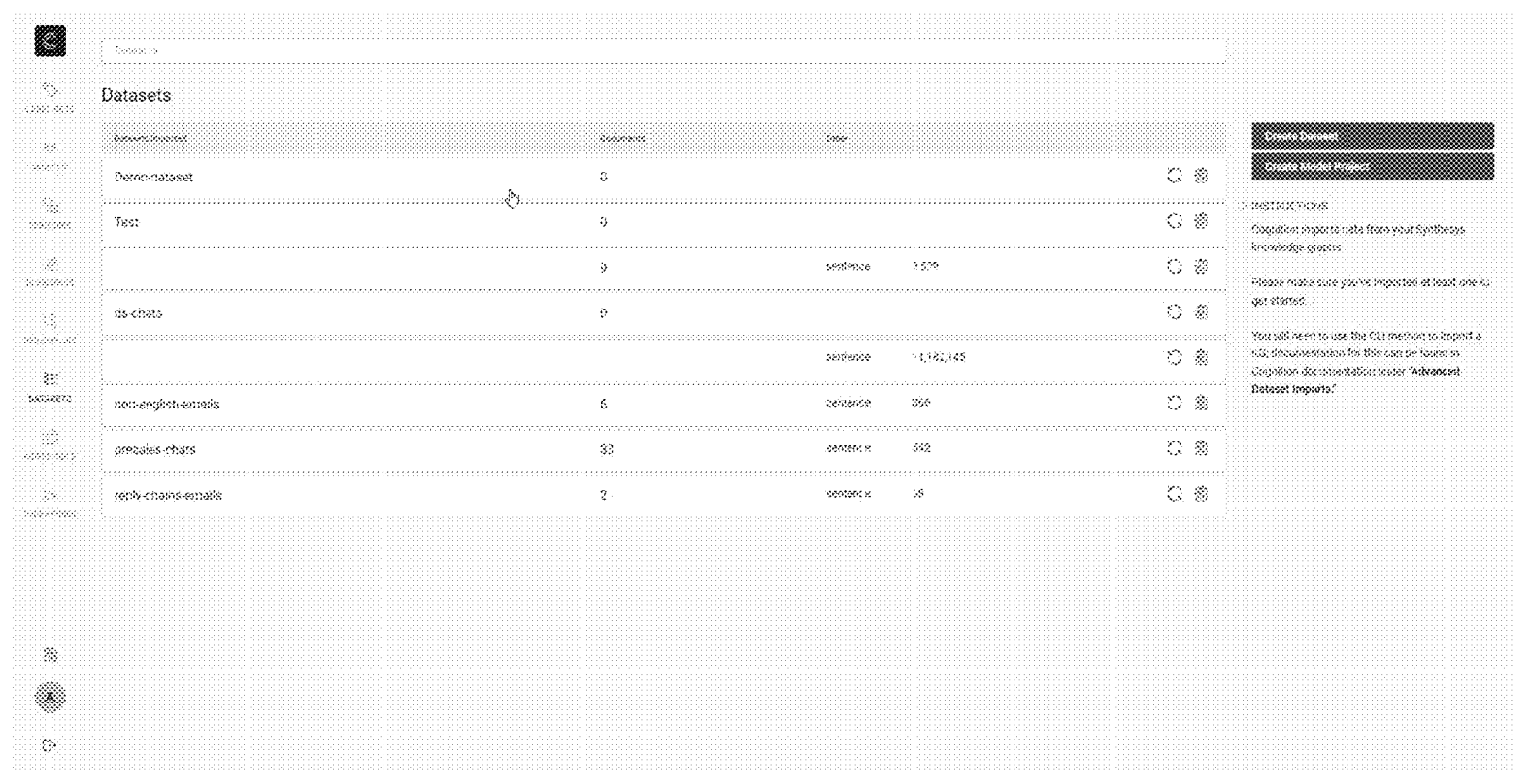
Figure 23B:
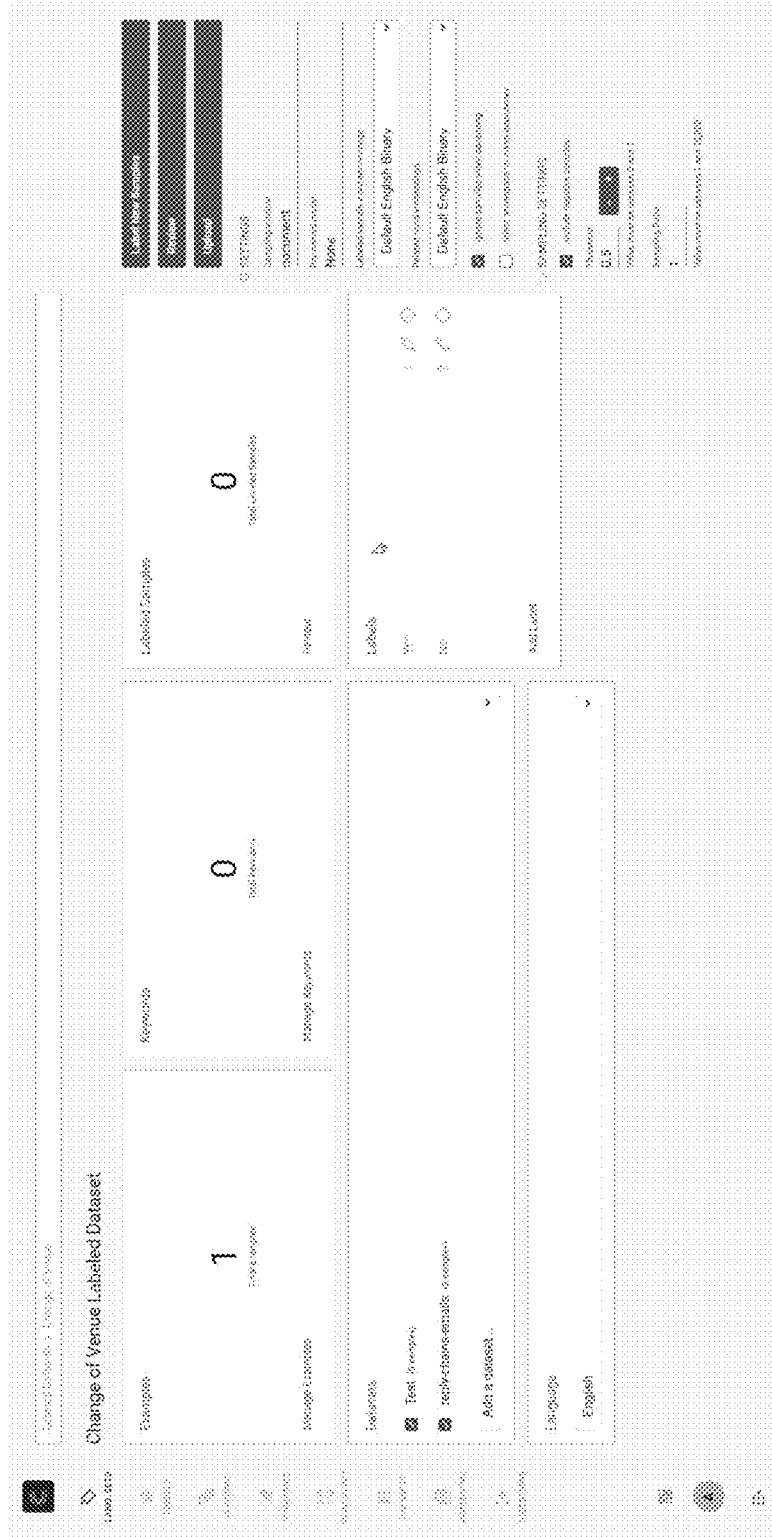
Figure 23C:
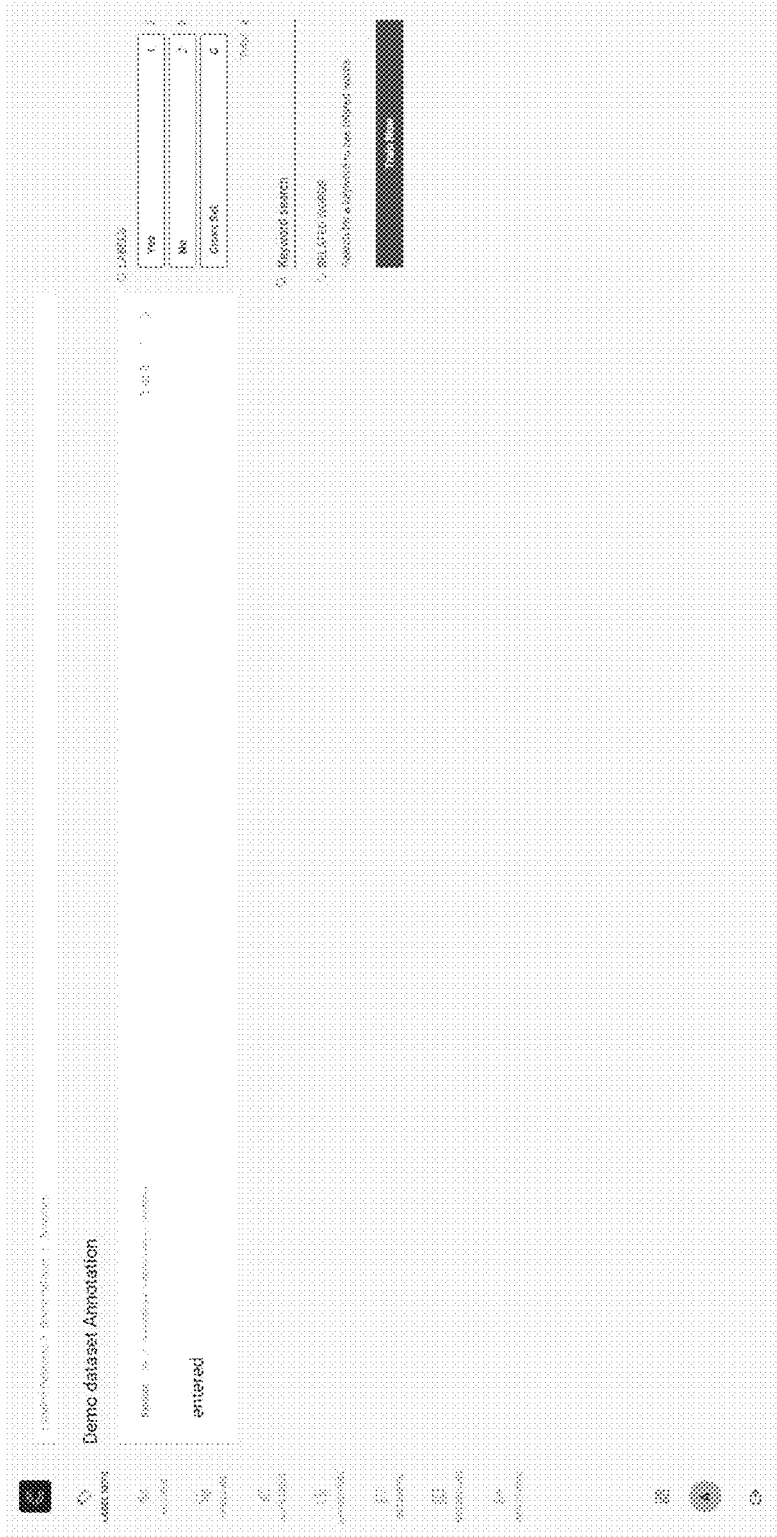
Figure 23D:
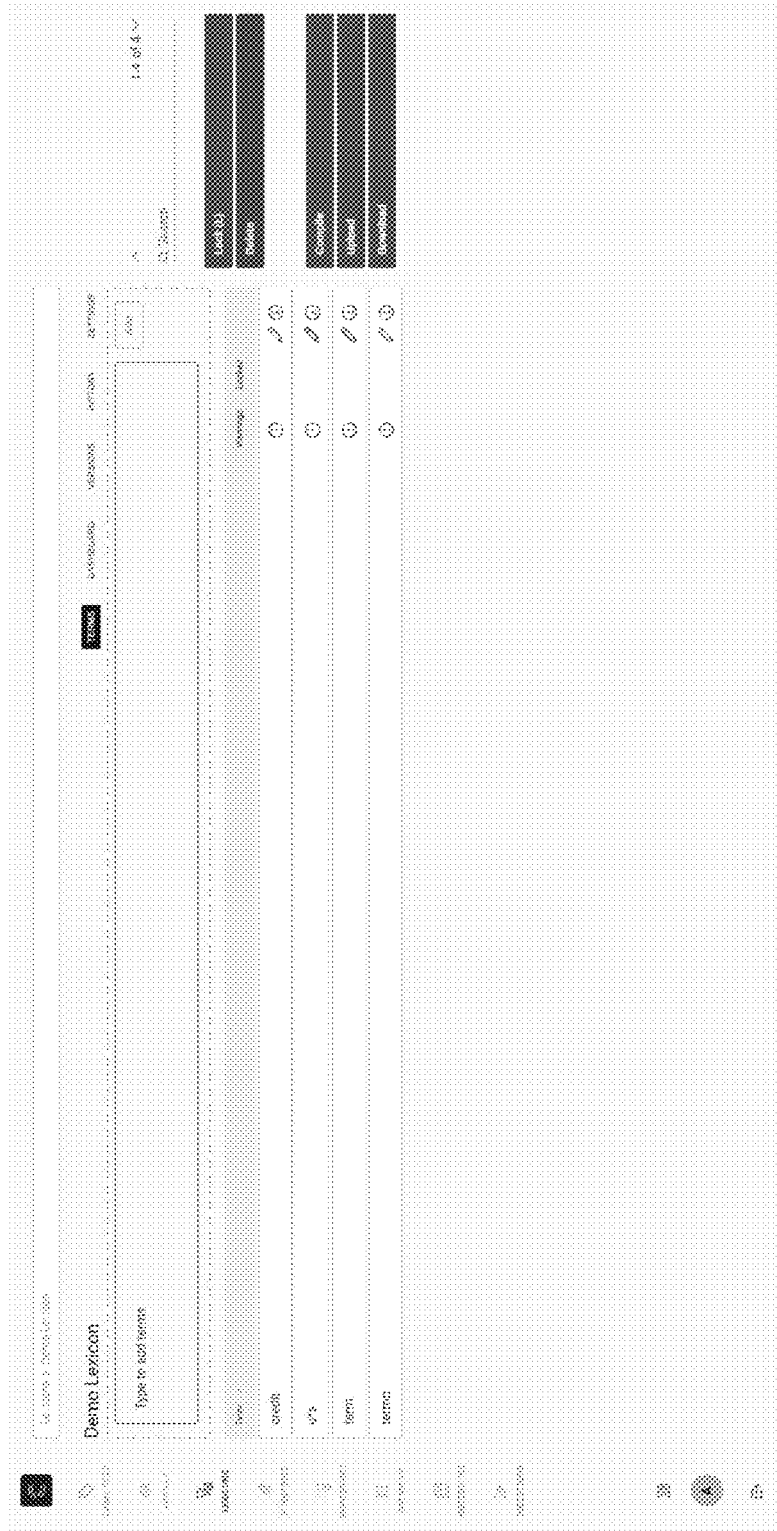
Figure 23E:
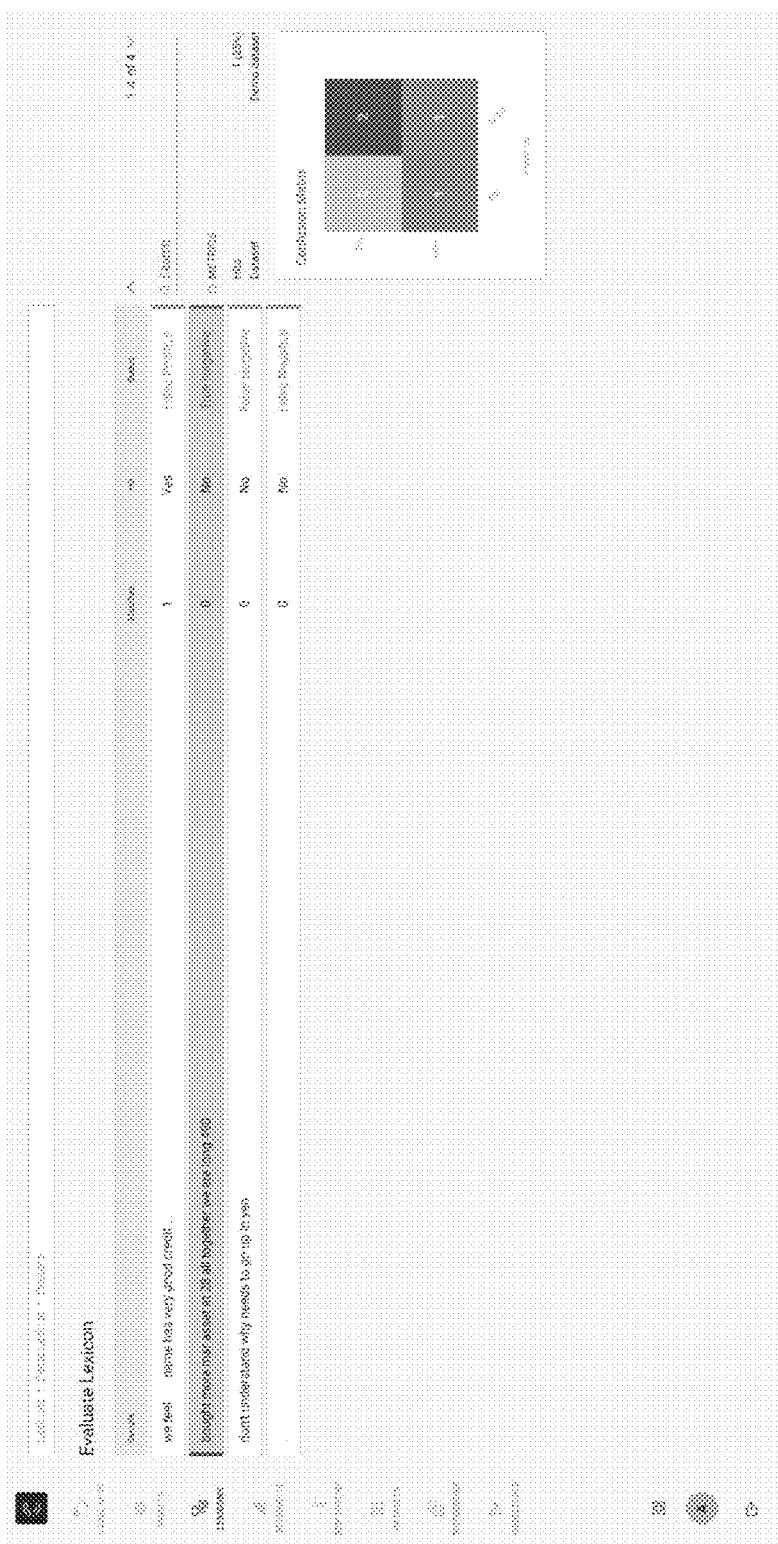
Figure 23F:
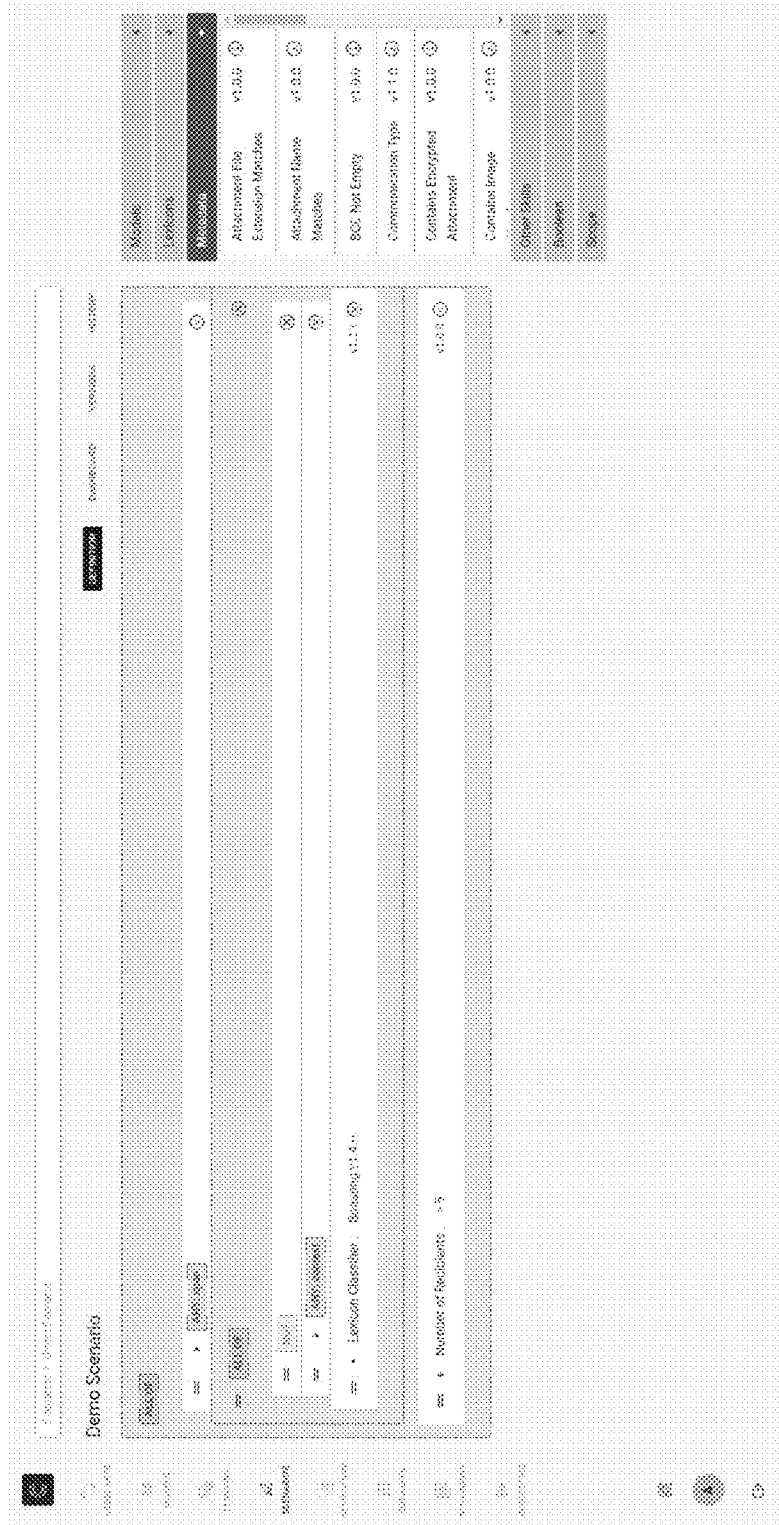
Figure 24:
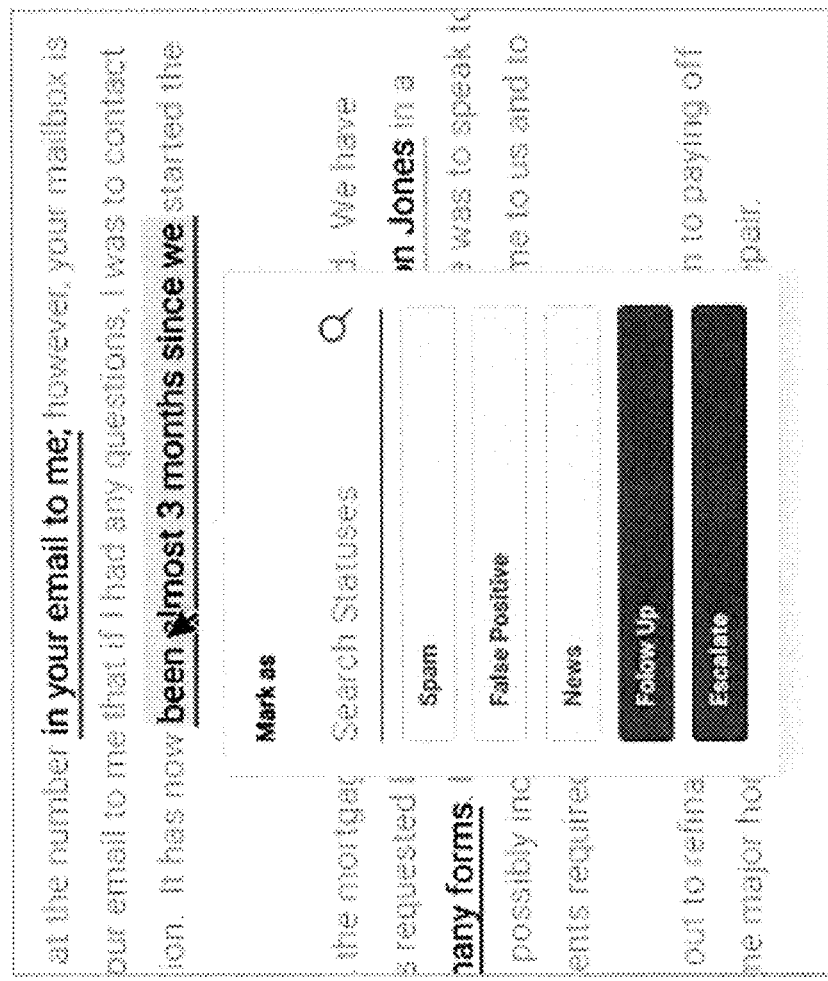
FIG. 24 illustrates various aspects of actioning communications in accordance with one or more embodiments of the present disclosure.
Figure 25:
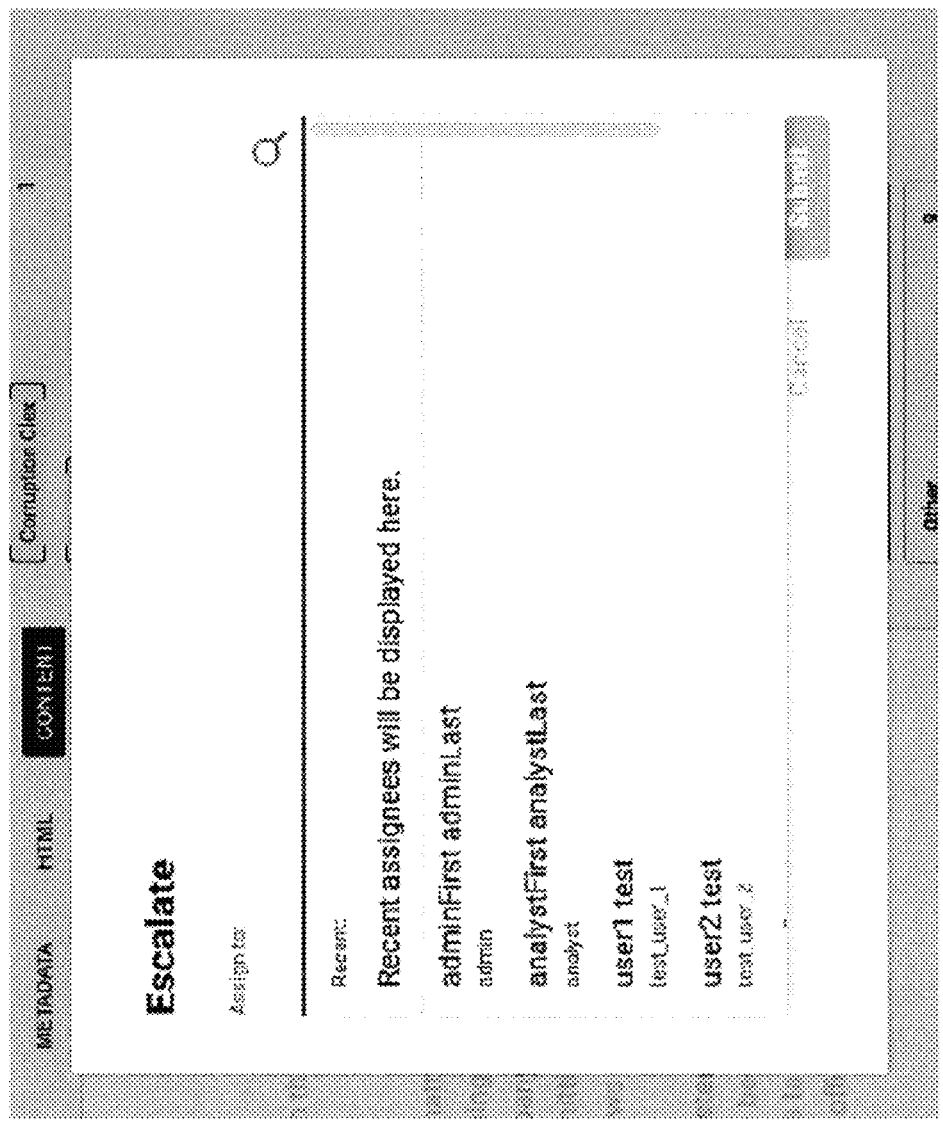
FIG. 25 illustrates various aspects of actioning communications in accordance with one or more embodiments of the present disclosure.

With reference to FIGS. 23A-23F, user interfaces for configuring a scenario according to one embodiment of the present disclosure are shown. FIG. 23A illustrates a user interface for viewing one or more datasets. FIG. 23B illustrates a user interface for labeling a dataset. FIG. 23C illustrates an annotation applied to a dataset and an interface for applying labels to a dataset. FIG. 23D illustrates a user interface for configuring a lexicon to be applied to the dataset. FIG. 23E illustrates a user interface for evaluating a lexicon. FIG. 23F illustrates a scenario created using the lexicon that was configured in the interface shown in FIG. 23E.

For purposes of illustration and not limitation, certain examples of use case implementations and contexts that may utilize certain aspects and embodiments disclosed herein, and/or environments in which such aspects and embodiments may be utilized, will now be discussed.

Certain functionalities described herein associated with user interactions and display, such as those relating to graphical user interfaces, can be applied to implementations in the context of proactive compliance in financial organizations, analyzing electronic communications in capital markets trading, proactively identifying an organization's insider threats, and/or healthcare records analytics. For example, some aspects and embodiments disclosed herein may be utilized for providing advantages and benefits in the area of communication surveillance for regulatory compliance.

Some implementations can be utilized, at least in part, in processing communications, including electronic forms of communications such as instance messaging (or "chat"), email, and social network messaging to connect and monitor an organization's employee communications for regulatory and corporate compliance purposes. Some embodiments of the present disclosure can provide for unify detection, review user interfaces, behavioral models, and policies across all communication data sources, and can provide tools for compliance analysts in furtherance of these functions and objectives. Some implementations can proactively analyze users' actions to identify breaches such as unauthorized activities that are against applicable policies, laws, or are unethical, through the use of natural language processing (NLP) models. The use of these models can enable understanding content of communications such as email and chat and map signals such as flight risk, apathy, and complaints to behavioral profiles in order to proactively locate high-risk employees.

Other aspects and embodiments disclosed herein can provide, in the context of capital markets trading, a way to organize, analyze, and visualize chat communications for quick search and discovery. Aspects of artificial intelligence in accordance with some embodiments of the present disclosure can structure instant messages to provide client insight, market transparency, and operational efficiency, which provides for managing high volume of conversations, measuring quality of a conversation, and monitoring a conversation from discussion to trade execution.

Still other aspects and embodiments disclosed herein can provide advantages in healthcare analytics with natural language understanding and machine learning to intelligently read medical reports such as pathology and radiology reports at the front-end of a cancer diagnosis and treatment process. In some implementations, cancer care workflow can be augmented in real-time by discovering, classifying, and prioritizing cancer cases for optimal follow-up; augmenting physicians, nurse navigators, care coordination and oncology pathway efficacy with intelligent workflow support, including dynamic work queues, care pathway matching, and care complexity triage; and extracting key data elements through cognitive analytics to automate and ease documentation burdens.

Example Computing System Architecture

FIG. 12 is a computer architecture diagram showing a general computing system capable of implementing one or more embodiments of the present disclosure described herein. A computer may be configured to perform one or more functions associated with embodiments illustrated in, and described with respect to, one or more of FIGS. 1-11 and 13-26. It should be appreciated that the computer may be implemented within a single computing device or a computing system formed with multiple connected computing devices. For example, the computer may be configured for a server computer, desktop computer, laptop computer, or mobile computing device such as a smartphone or tablet computer, or the computer may be configured to perform various distributed computing tasks, which may distribute processing and/or storage resources among the multiple devices.

As shown, the computer includes a processing unit, a system memory, and a system bus that couples the memory to the processing unit. The computer further includes a mass storage device for storing program modules. The program modules may include modules executable to perform one or more functions associated with embodiments illustrated in, and described with respect to, one or more of FIGS. 1-11 and 13-26. The mass storage device further includes a data store.

The mass storage device is connected to the processing unit through a mass storage controller (not shown) connected to the bus. The mass storage device and its associated computer storage media provide non-volatile storage for the computer. By way of example, and not limitation, computer-readable storage media (also referred to herein as "computer-readable storage medium" or "computer-storage media" or "computer-storage medium") may include volatile and non-volatile, removable and non-removable media implemented in any method or technology for storage of information such as computer-storage instructions, data structures, program modules, or other data. For example, computer-readable storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer. Computer-readable storage media as described herein does not include transitory signals.

According to various embodiments, the computer may operate in a networked environment using connections to other local or remote computers through a network via a network interface unit connected to the bus. The network interface unit may facilitate connection of the computing device inputs and outputs to one or more suitable networks and/or connections such as a local area network (LAN), a wide area network (WAN), the Internet, a cellular network, a radio frequency network, a Bluetooth-enabled network, a Wi-Fi enabled network, a satellite-based network, or other wired and/or wireless networks for communication with external devices and/or systems.

The computer may also include an input/output controller for receiving and processing input from a number of input devices. Input devices may include, but are not limited to, keyboards, mice, stylus, touchscreens, microphones, audio capturing devices, or image/video capturing devices. An end user may utilize such input devices to interact with a user interface, for example a graphical user interface on one or more display devices (e.g., computer screens), for managing various functions performed by the computer, and the input/output controller may be configured to manage output to one or more display devices for visually representing data.

The bus may enable the processing unit to read code and/or data to/from the mass storage device or other computer-storage media. The computer-storage media may represent apparatus in the form of storage elements that are implemented using any suitable technology, including but not limited to semiconductors, magnetic materials, optics, or the like. The program modules may include software instructions that, when loaded into the processing unit and executed, cause the computer to provide functions associated with embodiments illustrated in, and described with respect to, one or more of FIGS. 1A-11 and 13-26. The program modules may also provide various tools or techniques by which the computer may participate within the overall systems or operating environments using the components, flows, and data structures discussed throughout this description. In general, the program module may, when loaded into the processing unit and executed, transform the processing unit and the overall computer from a general-purpose computing system into a special-purpose computing system.

CONCLUSION

The various example embodiments described above are provided by way of illustration only and should not be construed to limit the scope of the present disclosure. Those skilled in the art will readily recognize various modifications and changes that may be made to the present disclosure without following the example embodiments and applications illustrated and described herein, and without departing from the true spirit and scope of the present disclosure.

What is claimed is:

1. A computer-implemented method, comprising:
   receiving data associated with an electronic communication;
   determining one or more attributes associated with the received data;
   determining, based on the one or more attributes, one or more classification labels;
   creating a machine learning model based on the one or more attributes associated with the received data and the one or more classification labels, wherein
   the machine learning model identifies one or more patterns associated with a first violation condition,
   the machine learning model comprises a key indicator (KI) model, and
   the machine learning model is pre trained for analysis of text data associated with one or more electronic communications;
   creating a lexicon comprising one or more terms associated with a second violation condition;
   creating a scenario by joining the first violation condition and the second violation condition with one or more Boolean operators; and
   configuring a computer system to detect violations in a target dataset using the scenario, wherein the target dataset comprises electronic communications.

2. The computer-implemented method of claim 1, wherein the scenario includes a filter configured to exclude a portion of the target dataset.

3. The computer-implemented method of claim 2, wherein the filter is configured to exclude portions of the target dataset with certain types of electronic communications.

4. The computer-implemented method of claim 1, wherein the method includes storing the scenario in a computer readable medium.

5. The computer-implemented method of claim 4, wherein the method includes comparing the stored scenario to a second stored scenario, and based on the comparison, outputting data representing the differences between the stored scenario and the second stored scenario.

6. The computer-implemented method of claim 1, wherein the received data comprises at least one of text data and metadata associated with the electronic communications.

7. The computer implemented method of claim 1, wherein the target dataset comprises at least one of text data and metadata associated with the electronic communications.

8. The computer-implemented method of claim 1, wherein the step of labeling the received data comprises determining whether the received data includes a segment of target language.

9. A non-transitory, computer-readable medium comprising instructions which, when executed by a processor, perform functions that comprise:
   receiving data associated with an electronic communication;
   determining one or more attributes associated with the received data;
   determining, based on the one or more attributes, one or more classification labels;
   creating a machine learning model based on the one or more attributes associated with the received data and the one or more classification labels, wherein
   the machine learning model identifies one or more patterns associated with a first violation condition,
   the machine learning model comprises a key indicator (KI) model, and
   the machine learning model is pre trained for analysis of text data associated with one or more electronic communications;
   creating a lexicon comprising one or more terms associated with a second violation condition;
   creating a scenario by joining the first violation condition and the second violation condition with one or more Boolean operators; and
   configuring a computer system to detect violations in a target dataset using the scenario, wherein the target dataset comprises electronic communications.

10. The computer-readable medium of claim 9, wherein the executable instructions further comprise a scenario that includes a filter configured to exclude a portion of the target dataset.

11. The computer-readable medium of claim 10, wherein the filter is configured to exclude portions of the target dataset with certain types of electronic communications.

12. The computer-readable medium of claim 9, wherein the executable instructions further comprise, when executed, storing the scenario in a computer readable medium.

13. The computer-readable medium of claim 12, wherein the computer-executable instructions comprise, when executed, comparing the stored scenario to a second stored scenario, and based on the comparison, outputting data representing the differences between the stored scenario and the second stored scenario.

14. The computer-readable medium of claim 9, wherein the received data comprises at least one of text data and metadata associated with the electronic communications.

15. The computer-readable medium of claim 9, wherein the target dataset comprises at least one of text data and metadata associated with the electronic communications.

16. The computer-readable medium of claim 9, wherein the step of labeling the received data comprises determining whether the received data includes a segment of target language.

17. A system comprising:
   one or more processors; and
   memory coupled with the one or more processors, the memory storing executable instructions that when executed by the one or more processors cause the one or more processors to effectuate operations comprising:

receiving data associated with an electronic communication;

determining one or more attributes associated with labelling the received data;

determining, based on the one or more attributes, one or more classification labels;

creating a machine learning model based on the one or more attributes associated with the received data and the one or more classification labels, wherein
the machine learning model identifies one or more patterns associated with a first violation condition,
the machine learning model comprises a key indicator (KI) model, and
the machine learning model is pre trained for analysis of text data associated with one or more electronic communications;

creating a lexicon comprising one or more terms or regular expressions associated with a second violation condition;

creating a scenario by joining the first violation condition and the second violation condition with one or more Boolean operators; and configuring a computer system to detect violations in a target dataset using the scenario, wherein the target dataset comprises electronic communications.

* * * * *